United States Patent [19]
Saylor et al.

[11] 4,104,681
[45] Aug. 1, 1978

[54] INTERLEAVED PROCESSOR AND CABLE HEAD

[75] Inventors: Richard Saylor, Monsey; Alfred A. Dalimonte, Westbury; Robert H. Nagel, New York, all of N.Y.

[73] Assignee: IDR, Inc., Farmingdale, N.Y.

[21] Appl. No.: 736,217

[22] Filed: Oct. 27, 1976

[51] Int. Cl.² .............................................. H04N 1/02
[52] U.S. Cl. .................................................. 358/141
[58] Field of Search .................... 358/83, 93, 141, 142

[56] References Cited

U.S. PATENT DOCUMENTS

| 3,602,891 | 8/1971 | Clark | 340/172.5 |
| 3,909,818 | 9/1975 | Dalke | 340/324 AD |

*Primary Examiner*—Robert L. Griffin
*Assistant Examiner*—Michael A. Masinick
*Attorney, Agent, or Firm*—Hubbell, Cohen, Stiefel & Gross

[57] ABSTRACT

An improved real time frame grabbing system for substantially instantaneously providing a continuous video display of a selectable predetermined video frame of information on a video display means from continuously transmittable video information comprises a plurality of means for transmitting the video information as a plurality of pseudo video scan lines with means being provided for selectively combining and interleaving corresponding identical out of phase digital information content containing pseudo video scan line portions of the plurality of transmission means corresponding pseudo video scan lines to provide an in phase composite combined interleaved pseudo video scan line to the video display means. This composite combined interleaved pseudo video scan line has a television video scan line format and is capable of comprising a complete self-contained composite packet of digital information equivalent in content to the content of either of the interleaved pseudo video scan lines and sufficient to provide an entire displayable row of video data characters to the video display means. The combined interleaved composite pseudo video scan line has an associated transmission time equivalent to that of a television video scan line. The interleaved information containing portions of the corresponding pseudo video scan lines of the plurality of pseudo video scan lines comprise different television video scan lines of the plurality of television video scan lines which comprise the composite pseudo video scan line displayable row. The system further includes television signal distribution means which comprise means for compensating for television transmission distortions in the provided composite combined interleaved pseudo video scan lines provided to the video display means by introducing controllable distortions in the provided composite combined interleaved pseudo video scan line signal prior to the distribution thereof.

28 Claims, 13 Drawing Figures

SYSTEM BLOCK DIAGRAM (SEE FIG.12) SHOWING CABLEHEAD IN BLOCK

DETAIL BLOCK DIAGRAM AT TYPICAL TRANSMITTER PORTION OF CABLEHEAD OF FIG. 1.

DETAIL BLOCK DIAGRAM
OF MASTER COMBINER
SYNCHRONIZER (MCS) OF
FIG. I.

CABLEHEAD WAVEFORMS

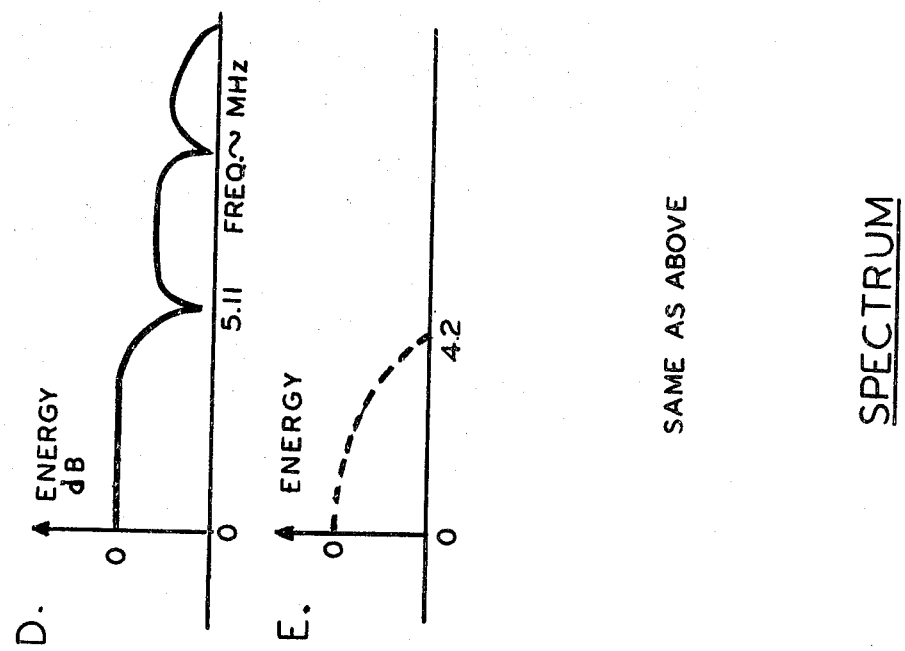
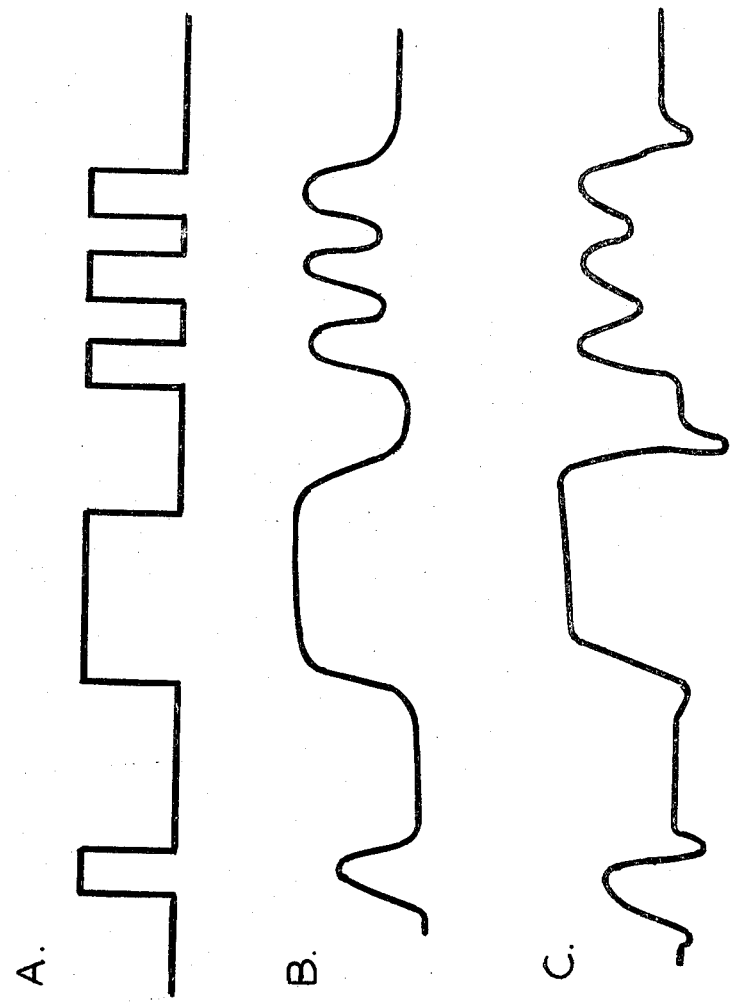
FIG. 11.
WAVE FORMS
SPECTRUM

INTERLEAVED PROCESSOR AND CABLE HEAD

CROSS-REFERENCE TO RELATED APPLICATIONS

This application is related to commonly owned U.S. Pat. No. 3,889,054, issued June 10, 1975, and is an improvement on the row grabbing system described therein; and is related to the following commonly owned copending U.S. patent applications: "Information Retrieval System Having Selectable Purpose Variable Function Terminal", filed Sept. 10, 1975, and bearing U.S. Ser. No. 611,927, by Robert H. Nagel; "Row Grabbing Video Display Terminal Having Local Programmable Control Thereof", filed Apr. 23, 1976, and bearing U.S. Ser. No. 679,558, by Lenard Wintfeld and Robert H. Nagel; "Improved Row Grabbing System", filed Sept. 10, 1975, and bearing U.S. Ser. No. 611,843, by Robert H. Nagel and Richard Saylor; "Interface for Enabling Continuous High Speed Row Grabbing Video Display With Real Time Hard Copy Print Out Thereof", filed Apr. 23, 1976, and bearing U.S. Ser. No. 679,907, by Richard Saylor; "Digital Video Signal Processor With Distortion Correction", filed Apr. 23, 1976, and bearing U.S. Ser. No. 679,909, by Richard Saylor; "Phase Locked Loop For Providing Continuous Clock Phase Correction", filed Apr. 23, 1976, and bearing U.S. Ser. No. 679,701, by Richard Saylor; and "Piggy Back Row Grabbing System", filed June 23, 1976, and bearing U.S. Ser. No. 699,088, by Richard Saylor; the contents of all of which are hereby specifically incorporated by reference herein.

BACKGROUND OF THE INVENTION

1. Field of the Invention

The present invention relates to video communication systems in which individual frames may be grabbed for video display thereof.

2. Description of the Prior Art

Video communication systems in which the individual frames may be grabbed for video display are well known, such as the system disclosed in U.S. Pat. No. 3,740,465, or a system employing the Hitachi frame grabbing disc. These prior art systems such as the one disclosed in U.S. Pat. No. 3,746,780 are normally two-way request response systems requiring the user to request information by the dialing of a specific digital code which is uniquely assigned to each frame. However, such systems normally grab a group of frames for storage and then subsequently select the individual frame for display out of the group of grabbed frames as opposed to instantaneously selecting a single frame in real time. Furthermore, such prior art systems do not provide for real time updating of the grabbed video frame. In addition, some such prior art frame grabbing systems, such as the type disclosed in U.S. Pat. No. 3,397,283, are normally capable of only grabbing the next immediate signal in response to the provision of a starter signal or, as disclosed in U.S. Pat. No. 3,051,777, utilize a counter or frame location which must be reset to the beginning of a tape for video tape supplied information in order to locate a selected frame to be grabbed. These systems are not applicable in a real time frame grabbing environment. Similarly, other typical prior art frame grabbing systems, such as disclosed in U.S. Pat. Nos. 3,695,565; 2,955,197; 3,509,274; 3,511,929 and 3,582,651, cannot be utilized in a real time frame grabbing environment, such as one in which the video information associated with the grabbed frame is capable of being continuously updated. Accordingly, presently available prior art frame grabbing systems familiar to the Inventors, other than commonly owned U.S. Pat. No. 3,889,054, are not capable of easily locating a frame to be grabbed in real time nor of being able to continuously update such a grabbed frame in real time.

Video communication systems in which the signal being transmitted is digitized are also well known. For example, U.S. Pat. No. 3,743,767 discloses a video communication system for the transmission of digital data over standard television channels wherein the digital data is transmitted in a conventional television scan line format through conventional television distribution equipment. However, such a prior art communication system merely digitizes one television scan line at a time for distribution to a video display terminal on a bit-by-bit basis in a line, 84 bits of information being provided per television scan line. Furthermore, such a prior art system is not transmission selectable by every display terminal nor is the data for a displayable video row packed into a self-contained pseudo video scan line information packet. Thus, there is no significant increase in the data transmission rate resulting from such a prior art video communication system. Similarly, U.S. Pat. Nos. 3,061,672 and 3,569,617 and German Pat. No. 2,307,414 are examples of other prior art video communication systems in which television signals are digitized without any significant resultant compression in data transmission time. Furthermore, these other prior art systems require special distribution circuitry. In addition, prior art video communication systems in which a digital television signal is transmitted do not sufficiently isolate the individual rows comprising a frame so as to provide satisfactory noise immunity between these rows nor is there satisfactory data compression in the transmission time of the video information in such prior art systems nor satisfactory distortion compensation.

Furthermore, although the row grabbing system described in our previously mentioned U.S. Pat. No. 3,889,054, issued June 10, 1975 overcomes several of the aforementioned disadvantages of the prior art, it would be desirable if the already high speed transmission rate of this row grabbing system could be further increased and furthermore, if the system reliability of such a row grabbing system which was continuously utilized for the continuous transmission of real-time information could be further enhanced.

These disadvantages of the prior art are overcome by the present invention.

SUMMARY OF THE INVENTION

A real time frame grabbing system for substantially instantaneously providing a continuous video display of a selectable predetermined video frame of information on a video display means from continuously transmittable video information comprises at least a first means for transmitting the video information as a first plurality of pseudo video scan lines, second means for transmitting the video information as a second plurality of pseudo video scan lines and means for selectively combining and interleaving corresponding identical out of phase digital information content containing pseudo video scan line portions of the first and second plurality of pseudo video scan lines to provide an in phase composite combined interleaved pseudo video scan line to the video display means. Each of the pseudo video scan lines from the first and second transmitting means has a television video scan line format and is capable of comprising a complete self-contained packet of digital information sufficient to provide an entire displayable row of video data characters. This displayable row comprises a plurality of television video scan lines. The pseudo video scan line has an associated transmission time equivalent to that of the television video scan line with the packet of digital information contained therein comprising at least address information for the displayable row and data information for the displayable characters in the displayable row. The first transmitting means transmits the first plurality of pseudo video scan lines out of phase in time in a predetermined phase relationship, such as 180° out of phase in the instance of two transmitting means, with the transmission of the second plurality of pseudo video scan lines by the second transmitting means with, however, the digital information content of the first and second plurality of pseudo video scan lines being substantially indentical. The composite combined interleaved pseudo video scan line provided from the combining and interleaving means also has a television video scan line format and is capable of comprising a complete self-contained composite packet of digital information equivalent in content to the content of either of the interleaved pseudo video scan lines and sufficient to provide the entire displayable row of video data characters to the video display means. The combined interleaved composite pseudo video scan line also preferably has an associated transmission time equivalent to that of a television video scan line. The interleaved information containing portion of the corresponding pseudo video scan line of the first plurality of pseudo video scan lines preferably comprises different television video scan lines, such as odd numbered television scan lines, of the plurality of television video scan lines which comprise the composite pseudo video scan line displayable row than the interleaved portions of the corresponding pseudo video scan lines of the second plurality of pseudo video scan lines which, in the above instance, would then occupy even numbered television video scan lines. The combining and interleaving means also preferably comprises means for providing a video black signal for each of the television video scan lines of the plurality comprising the composite displayable row for which a corresponding pseudo video scan line portion is not transmitted, in which instance, the combining and interleaving means provides the composite combined interleaved pseudo video scan line from the corresponding pseudo video scan line portion transmitted from the transmitting means and the video black signals in the absence of the transmission of corresponding pseudo video scan line portions from the second transmitting means, and vice versa. The combining and interleaving means also preferably includes means for providing a composite video signal as the composite combined interleaved pseudo video scan line, including means for providing a horizontal sync signal at the beginning of each of the composite combined interleaved pseudo video scan lines which provides a record separator between adjacent composite combined interleaved pseudo video scan lines, the combining and interleaving means further providing a vertical sync signal after a predetermined plurality of composite combined interleaved pseudo video scan lines have been provided therefrom. In addition, the combining and interleaving means further comprises means for providing at least one empty line, and preferably three such empty lines, to the video display means after vertical blanking but prior to data line transmission of a plurality of composite combined interleaved pseudo video scan lines which comprise the video frame and means for inserting a start bit pulse in the empty lines for enabling phase lock by the video display means prior to the reception of data at the start of the vertical video frame.

The system further comprises television signal distribution means for distributing the provided composite combined interleaved pseudo video scan line signals to the video display means for providing the continuous video display as well as receiver means operatively connected between the television signal distribution means and the video display means for processing the distributed composite combined interleaved pseudo video scan line signals and capable of providing a displayable video row signal to the video display means from each of the composite combined interleaved pseudo video scan line signals pertaining to the selected frame for providing the continuous video display. A predetermined plurality of displayable video rows comprises the displayable video frame of information. The aforementioned receiver means preferably comprises means for updating the continuously video displayable selectable frame on a displayable video row-by-row basis dependent on the real time data information content of the received composite combined interleaved pseudo video scan lines. Each of the packets of digital information comprised in the composite combined interleaved pseudo video scan lines further comprise an error check information content based on the data information content for the displayable characters of an associated composite combined interleaved pseudo video scan line. The receiver signal processing means comprises error check means for obtaining an error check indication from the distributed associated composite combined interleaved pseudo video scan line and comparing the error check indication with the error check information content of the associated composite combined interleaved pseudo video scan line in accordance with a predetermined error check condition for providing a predetermined output condition signal when the error check condition is satisfied. The receiver signal processing means further comprises condition responsive means operatively connected to the error check means to receive the predetermined output condition signal therefrom when provided. This condition responsive means inhibits the provision of the displayable video row from the associated composite combined interleaved pseudo video scan line signal when the predetermined output condition signal is not provided thereto.

The television signal distribution means preferably comprises means for compensating for television transmission distortion in the provided composite combined interleaved pseudo video scan lines provided to the video display means. This distortion compensation means comprises means for limiting the associated energy distribution of the waveform comprising the provided composite combined interleaved pseudo video scan line signal to bring this energy distribution within restrictions associated with the television signal distribution means, such as with a cable TV system if that is the means of television signal distribution utilized. This limiting means preferably comprises a $sin^2$ filter means for introducing a controllable distortion in the provided composite combined interleaved pseudo video scan line signal which thereby provides the energy distribution limitations. The distribution of the controllably distorted signal through the television signal distribution means provides the composite combined interleaved pseudo video scan line signal to the receiver means substantially free of such television transmission distortion. The distortion compensation means also preferably comprises means operatively connected to the filter means for compensating for television transmission distortions introduced by envelope detection of vestigal sideband television demodulation by providing an additional controllable distortion in the controllably distorted provided signal from the filter means. The distribution of this additionally controllably distorted signal through the television signal distribution means provides the composite combined interleaved pseudo video scan line signal to the receiver means substantially free of such vestigal sideband demodulation distortion.

BRIEF DESCRIPTION OF DRAWINGS

FIGS. 11A through 11E comprise a timing diagram of graphic illustrations of the various waveforms and their associated energy distributions present in the output network of FIG. 9;

DETAILED DESCRIPTION OF PREFERRED EMBODIMENTS

"General System Description"

Figure 1:
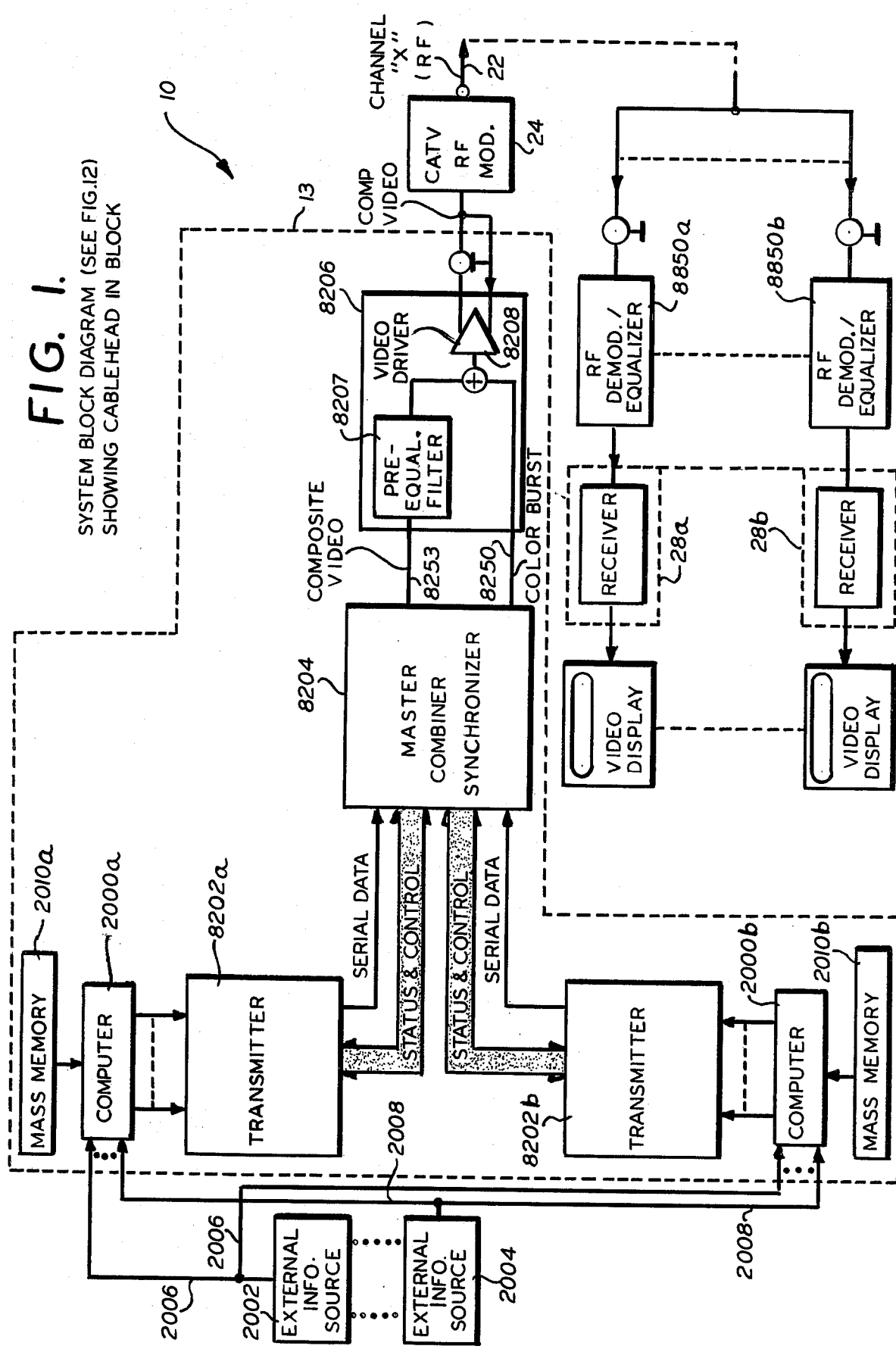
FIG. 1 is a system block diagram of the preferred embodiment of the row grabbing system of the present invention.

The improved row grabbing system of the present invention, generally referred to by the reference numeral 10, is shown in block in FIG. 1 which includes a block diagram of the preferred improved cable head, generally referred to by the reference numeral 13, of the present invention. The cable head 13 is the system for providing the pseudo video scan lines of the type described in commonly owned copending U.S. patent application Ser. No. 611,843, filed Sept. 10, 1975 and entitled "Improved Row Grabbing System", the contents of which are specifically incorporated by reference herein, this system being a further improvement on the system described in the aforementioned copending patent application. With respect to FIG. 1 of the present invention, this figure corresponds to an improvement on what is shown in FIG. 19 of the aforementioned copending patent application and identical reference numerals are used herein for identically functioning components with the same reference numerals followed by the letters a and b, respectively, if there is a plurality of such similarly functioning elements. As shown and preferred in FIG. 1, the improve preferred cable head 13 preferably includes a pair of computers 2000a and 2000b, each having an associated mass memory 2010a and 2010b, respectively, which are preferably identical in function and operation to computer 2000 and associated mass memory 2010 as previously described in the aforementioned copending U.S. patent application with the exception that information provided from computer 2000a and 2000b is preferably identical in content but 180° out of phase in terms of time relationship to the provision of this information, as will be described in greater detail hereinafter. Of course, as will be apparent to one of ordinary skill in the art, the resultant 180° phase differential may be accomplished in other manners.

The information output of computer 2000a is preferably provided to an improved preferred transmitter portion 8202a and the information output of computer 2000b is preferably similarly provided to an improved preferred transmitter portion 8202b. Preferably transmitter portions 8202a and 8202b are identical in function and operation and one such typical transmitter portion 8202a shall be described in greater detail hereinafter with reference to FIGS. 1, 3, 6, 7 and 8. The transmitter portions 8202a and 8202b preferably provide both serial data information and status and control information to a preferred master combiner and synchronizer portion 8204, with the status and control information being bidirectional, that is transmitted to and from master combiner and synchronizer portion 8204, whereas the serial data information is unidirectional only, that is only transmitted to master combiner and synchronizer portion 8204, both being provided from the respective transmitter portion 8202a or 8202b to the common master combiner and synchronizer portion 8204 in the presently preferred embodiment of the present invention. As will be described in greater detail hereinafter, with reference to FIGS. 4 and 5, the master combiner and synchronizer portion 8204 preferably combines the pseudo video scan line information transmitted from each of the computers 2000a and 2000b to generate a single pseudo video scan line output. This is preferably accomplished by the master combiner and synchronizer portion 8204, as will be described in greater detail hereinafter with reference to FIGS. 4 and 5, by the master combiner and synchronizer portion 8204 preferably placing packets of digital information comprising a pseudo video scan line from one computer, for example computer 2000a, on odd television scan lines while placing packets of digital information comprising a pseudo video scan line provided from the other computer, such as computer 2000b by way of example, on even television scan lines, both the odd and even television scan lines being combined to comprise the single composite psuedo video scan line output of master combiner and synchronizer portion 8204. If either or both computers 2000a and 2000b stop sending packets of such digital information, in the interleaved mode, their respective associated or assigned scan lines in the output of portion 8204 preferably remain video "black". Furthermore, if desired, in the preferred system 10 of the present invention, either the odd or even transmission of such information, from either computer 2000a or 2000b, respectively, can be turned off and the system can operate with a single computer, 2000a or 2000b in the manner described in the aforementioned copending patent application is such interleaved transmission is not desired or if one of the computers 2000a or 2000b becomes inoperable, in which instance, as will be described in greater detail hereinafter, the retrieval or access rate of the information becomes halved as compared to the rate associated with the interleaved transmission. As will further be described in greater detail hereinafter, consequently, by utilizing the preferred interleaved transmission provided from the two computers 2000a and 2000b which provide identical information preferably 180° out of phase, the access time for this information is preferably half the access time obtained from the system described in the aforementioned copending U.S. patent application when only one such computer is utilized.

Figure 2:
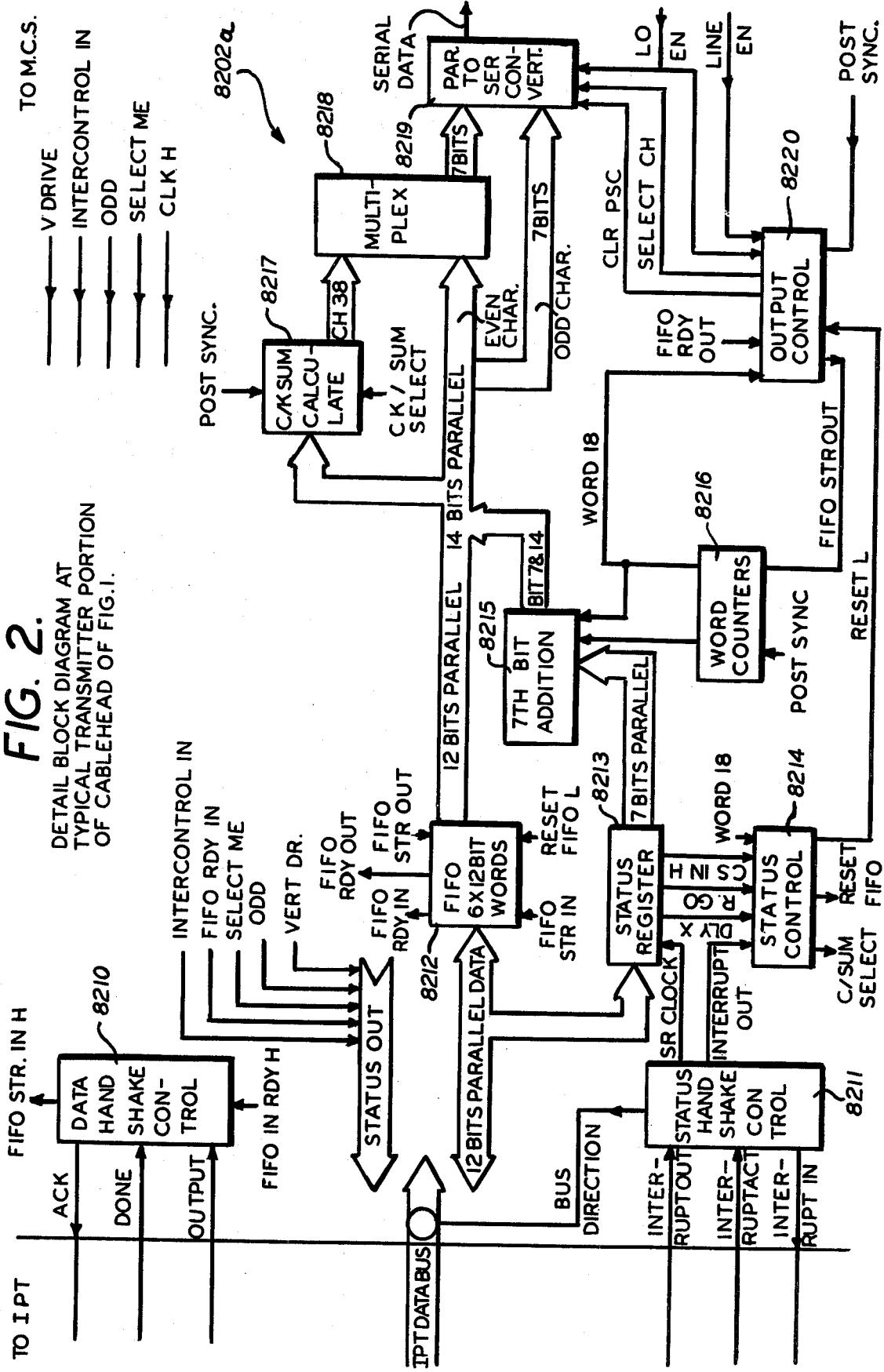
FIG. 2 is a more detailed block diagram of a typical transmitter means portion of the system of FIG. 1.
Figure 13:
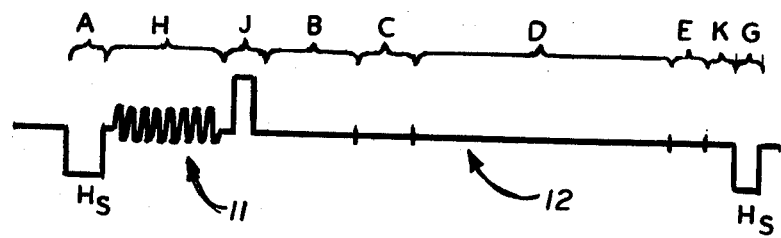
FIG. 13 is a diagrammatic illustration of the preferred pseudo video scan line provided by the cable head portion of the system of FIG. 1.

As further shown and preferred in FIG. 1, the improved cable head 13 also preferably includes an output network 8206. The output network receives the output from the master combiner and synchronizer portion 8204, which is preferably a composite video signal and a separate color burst signal, the composite video signal preferably being a composite black and white type of video signal. Output network 8206 preferably includes a pre-equalization filter 8207 which preferably compensates for signal distortion in the composite video signal output of the master combiner and synchronizer 8204 as will be described in greater detail hereinafter with reference to FIGS. 9 and 11A through 11E. Ther output network 8206 also preferably includes a conventional video line driver 8208 which is connected to the output of a conventional summing network 8209 which sums the color burst signal with the distortion compensated composite video signal output of pre-equalization filter 8207 to preferably provide a composite color type of television signal; that is a pseudo video scan line which has the characteristics of a conventional color television scan line, in that it has color burst, with the exception that no color subcarrier is provided in the composite color pseudo video scan line output 12a of network 8206. This output signal 12a is preferably the same type of signal as illustrated in FIG. 2 of the aforementioned copending U.S. patent application and which diagram is repeated herein as FIG. 13 for purposes of clarity. As shown and preferred in FIG. 13, this pseudo video scan line 12a, as was previously described, is identical in format to a conventional video scan line; that is, it is consistent with FCC and EIA standards for video scan line signal format; however this pseudo video scan line 12a actually contains a row of information, such as approximately between 11 and 13 actual television video scan lines of information with the transmission time of the pseudo video scan line 12a being equal to the transmission time of a conventional TV video scan line, which is approximately 63 microseconds. With respect to the pseudo video scan line 12a, the horizontal sync and vertical sync portions are preferably identical to a conventional video signal as is the format for the horizontal sync and the vertical sync as well as the horizontal sync amplitude. The time and ampliude envelope of the video region of the pseudo video scan line 12a, which region is defined as areas H, J, B, C, D, E and K in FIG. 13, is identical with the format for a conventional video scan line as is the three dimensional frequency envelope. Thus, all of the above mentioned standard conditions for a conventional video scan line signal are met by the pseudo video scan line 12a provided at the output of network 8206. Accordingly, any equipment that can handle conventional video can handle the pseudo video scan line output 12a signal which can thus be transmitted and received through a conventional television distribution system with conventional television equipment.

Figure 3:
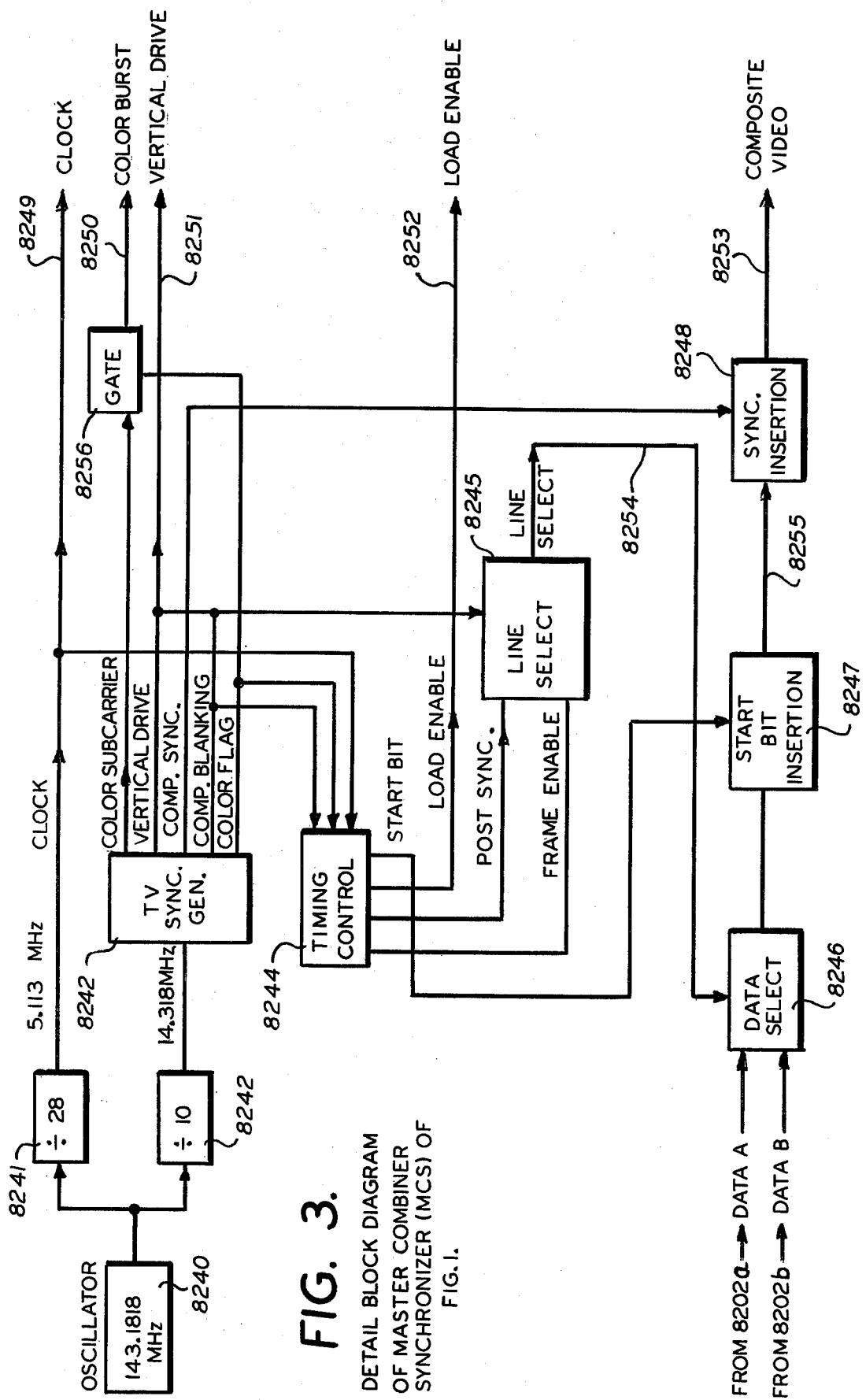
FIG. 3 is a more detailed block diagram of the master combiner synchronizer portion of the system of FIG. 1.

Returning once again to the pseuo video scan line 12a illustrated in FIG. 3, as is also true for the pseudo video scan line of the type previously described in U.S. Pat. No. 3,889,054, this signal is in reality a digital signal which looks like conventional video scan line to the receiver 28a or 28b. Pseudo video scan line 12a, as will be described in greater detail hereinafter, however, preferably employs a start bit to provide timing and phase adjustment for the phase locked loop of the receiver terminal 28a or 28b s described in the aforementioned copending patent application. In such an instance, region F which was previously contained in the pseudo video scan line transmitted in the system of U.S. Pat. No. 3,889,054, and which contained the clock synchronizing burst or pulse train at the bit rate (the frequency preferably being equal to one-half the bit rate) and comprised a pulse train of ones and zeros for two character spaces or 14 bits, is not present and the sync burst information which was previously contained therein is not required for timing and phase adjustment. Instead, region H, which preferably contains color burst information and region J which preferably contains one start bit, are preferably inserted between regions A and B, with regions B, C, D and E being electronically shifted down in position to be adjacent region G, only being separated therefrom by a region K, which region K merely represents the standard TV spacing for providing the front porch of the signal, the back porch of the signal being defined between region A and the leading edge of the start bit in region J. The color burst signal in region H preferably is the standard FCC eight cycle signal at 3.58 megahertz. Apart from the repositioning and deletion of certain regions of the pseudo video scan line, the contents of regions A, B, C, D, E and G in pseudo video scan line 12 of FIG. 13 are preferably identical with that previously described with reference to FIG. 1 of U.S. Pat. No. 3,889,054 with respect to the transmission of a displayable row of data. Suffice it to say for purposes of clarity, that region A represents the horizontal sync signal which indicates the beginning of the pseudo video scan line from the beginning of the horizontal sweep for a conventional television scan line; and region B represents the pseudo video scan line 12a address which contains all the following information bit locations, a one preferably indicating the presence of a pulse and a zero preferably indicating the absence of a pulse, all of the following information bits preferably being present when data is transmitted: group, which is the section or chapter including a predetermined number, such as 1,000, of pages and is the most significant bit of the page address, page, which represents one frame in a group, and row which occupies one character space which is preferably 7 bits and defines a portion of the page preferably containing approximately 11 to 13 scan lines which comprise one displayable character. The region B also preferably contains direct address information, which is the first transmitted bit preferably and is a zero unless a direct address condition exists which is a control condition for a selected terminal informing the terminal to supercede the requested page. This region B also preferably contains permission information which is a one bit position which is preferably a one only when the user is being given authority to receive one or more selected groups of information. It should be noted that preferably there is also an emergency override condition which provides control information to all terminals to override all requests including the permission request and preferably occurs on a page and group information bit location of zero, this condition preferably being utilized to display emergency information such as a civil defense warning. Region C is preferably a special character information region of 7 bits which is preferably utilized for optional functions to be performed by the individual receiver 28a to 28b or terminal. Region D preferably contains 32 characters of displayable information in digital form. Region E preferably contains error check information, as will be described in greater detail hereinafter. Region G is preferably the same as region A and represents the horizontal sync signal. As was previously mentioned, the vertical sync is preferably provided by generating a special sequence of horizontal sync pulses during the normal television blanking period, which is after approximately 236 horizontal sync pulses, which as in U.S. Pat. No. 3,889,054 may preferably be after approximately 15 pages have been transmitted. Therefore, 15 pages are transmitted before each vertical sync. The sync signal looks like a conventional composite sync signal with a vertical sync interval comprising approximately nine normal horizontal sync pulse times.

The aforementioned combined composite psuedo video scan line signal output of network 8206 is preferably provided to a conventional CATV RF modulator 24, such as the type of modulator described in the aforementioned copending U.S. patent application, one such modulation 24 being preferably provided for each television channel on which formation is to be transmitted, only one such channel being illustrated in FIG. 1 by way of example. Modulator 24, by way of example, preferably provides this information to a conventional CATV cable system 22 such as described in the aforementioned copending U.S. patent application.

Referring now to the type of video information provided to the system of FIG. 1, this information is provided from external information sources, two such sources 2002 and 2004, being shown by way of example. The provision of this external information, as is the operation of computers 2000a and 2000b and associated mass memories 2010a and 2010b, is preferably identical with that described in the aforementioned copending U.S. patent application, or in U.S. Pat. No. 3,889,054, with the exceptions thereto to be described in greater detail hereinafter. Thus, the associated mass memories 2010a and 2010b are preferably read in conventional fashion by the associated computers 2000a and 2000b to provide the requisite information via the associated transmitter portions 8202a, 8202b to the master combiner and synchronizer 8204, which information is preferably interleaved as previously generally described, with the associated mass memories 2010a and 2010b each preferably having sufficient storage capacity to store the entire page capacity of the system 10. As will be described in greater detail hereinafter, each of the computers 2000a and 2000b may preferably be, by way of example, either a PDP-8E or PDP-11 manufactured by Digital Equipment Corporation, with respective associated mass memories 2010a and 2010b normally utilized with such computers 2000a and 2000b, respectively. These computers need not both be the same such as, by way of example, utilizing a PDP-8E for computer 2000a and a PDP-11 for computer 2000b.

It should be noted that as used throughout the specification and claims, the term "page" means one video frame of information, the term "group" means a predetermined number of pages, the term "row" is a displayable video row and means a portion of a page containing a plurality of conventional television video scan lines, and the term "pseudo video scan line" means a signal which is identical in form to that of a conventional video scan line but which actually contains a row of information, such as approximately between 11 and 13 actual television video scan lines of information with the transmission time of the pseudo video scan line preferably being equal to the transmission time of a conventional TV video scan line, which is approximately 63 microseconds, and with the pseudo video scan line being an entire packet of information necessary for video display of that row. The term conventional or television video scan line or TV scan line is used in its conventional manner.

"Typical Transmitter Portion"

General Description

Referring now to FIG. 2, FIG. 2 is a detailed block diagram of a typical transmitter portion, such as transmitter portion 8202a, of the preferred cable head 13 shown in FIG. 1. As previously alluded to, there are preferably two types of transfers that can take place between the computer 2000a or 2000b and the cable head 13, a status transfer and a data transfer. The status transfer is preferably bidirectional, that is the computer 2000a or 2000b can send status to the cable head 13 and receive status from the cable head 13. A status transfer to the cable head 13 preferably consists of a single word transfer as does a status transfer from the cable head 13. Such a status word is preferably returned from the cable head 13 after every status word received by the cable head 13. The second type of aforementioned transfer that can preferably take place is the unidirectional transfer of data from the computer 2000a or 2000b to the cable head 13. This is accomplished through the data break, that is the direct memory access facility of the computer 2000a or 2000b. Such data transfers must preferably consist of an integral number of data packets per transfer, with each such data packet preferably consisting of 20 words, each word preferably comprising 12 (PDP-8E) or 16 (PDP-11) bits. The principal video data characters are preferably transmitted in six bit sequences. Thus, data is preferably transferred from the computer 2000a or 2000b in a direct memory access transfer. The aforementioned status word transfer from the computer 2000a or 2000b is preferably utilized to insert a seventh bit of data for each transmitted video character. This seventh bit of data is preferably utilized, principally, for special applications of the preferred system of the present invention. An example of such use would be when it is desired to display graphic symbols as well as characters. The status transfer for generation of the seventh bit is preferably used only when the computer 2000a or 2000b is a 12 bit machine such as is the case with the PDP-8E. The PDP-11 is a 16 word machine and when it is used the seventh bit is included as part of the direct memory access transfer word. The status word transfer from the cable head 13 to the computer 2000a or 2000b is preferably used to provide the computer 2000a or 2000b with information pertaining to the mode of operation of the cable head 13. Examples of this kind of information are start of vertical field, odd or even line transmissions, or operator control settings.

Referring to FIG. 2, which is a detailed block diagram of typical transmitter portion 8200a, the typical transmitter portion 8202a includes control circuits 8210 which are involved with the direct memory access data transfer. The output line from the computer 2000a or 2000b is asserted whenever data is available. These control circuits 8210 preferably respond thereto by asserting the "acknowledgment" line. When a complete transfer of data has been completed, the computer 2000a or 2000b asserts the "done" line. Portion 8202a also includes control circuits 8211 which control the operation of data transfer during a status word transfer. This is accomplished via the various interrupt lines to the computer 2000a or 2000b. These will be described in greater detail hereinafter. During data transfer the 12 bit data words from the computer 2000a or 2000b are applied to a conventional first in-first out buffer 8212. This buffer 8212 permits words to be stored and then shifted out asynchronously. Buffer 8212 applies the output data words to an output multiplexer 8218 and to a check sum circuit 8217. Depending on the setting of the status word, a status register 8213 may apply a seventh bit to the data stream via a seventh bit addition circuit 8215. During the transmission of a pseudo video scan line, check sum circuit 8217 continously adds digitally the value of one 7 bit word to the sum of the previous words of that same line. This operation preferably continues through 37 video characters. During the 38th and preferably final character of the pseudo video scan line the sum is deposited as the 38th character. Multiplexer 8218 preferably selects the data words for the check sum depending on the associated character numbers. As shown and preferred in FIG. 2, a parallel to serial converter 8219 converts the seven bit data words to a serial data line. This line is fed to the master combiner synchronizer 8204. Other control circuits and counters illustrated in FIG. 2 are used to control the operation and timing of the aforementioned circuits as well as of a status control circuit 8214, word counters 8216 and an output control circuit 8220, all of which will be discussed in greater detail hereinafter. A more detailed description of the function and operation of the various circuits illustrated by the functional blocks 8210, 8211, 8212, 8213, 8214, 8215, 8216, 8217, 8218, 8219 and 8220 in FIG. 2 which comprise the typical preferred transmitter portion 8202a of the preferred cable head 13 will be described in greater hereinafter with reference to FIGS. 7 and 8.

"Master Combiner Synchronizer Portion"

General Description

Referring now to FIG. 3, FIG. 3 is a detailed block diagram of the preferred embodiment of the master combiner synchronizer portion 8204 of the preferred cable head 13 illustrated in FIG. 1. As shown and preferred in FIG. 3, portion 8204 includes a conventional oscillator 8240, which is the single source of all timing signals within the cable head 13. This oscillator 8240 is preferably a crystal controlled 143.1818 meghertz oscillator. The output of this oscillator 8240 is preferably applied to two conventional frequency dividers 8241 and 8242. Divider 8241 preferably divides the oscillator frequency by a factor of 28 to preferably provide a 5.113 megahertz signal which is the clock for the data. This clock preferably establishes the timing of the data bits in the pseudo video TV scan line. The other frequency divider 8242 preferably divides the oscillator frequency by a factor of 10 to provide a 14.318 megahertz signal to a conventional TV sync generator 8243. This sync generator 8243 preferably includes additional conventional frequency dividers and gating circuits as necessary for generating conventional televison synchronizing signals and color reference signals. A television color burst signal is generated on line 8250 at the output of gate 8256. This gate 8256 preferably receives a continous burst subcarrier and a color flag from the sync generator 8243. The color flag is preferably used to gate the color subcarrier to generate the color burst provide via path 8250. Master combiner synchronizer portion 8204 also preferably includes timing control circuit 8244 which utilizes the composite blanking, color flag, and 5.113 megahertz clock to generate character timing signals. One of these signals, the load enable signal is provided via path 8252 to the transmitters 8202a and 8202b to establish the time for loading data words into the parallel-to-serial converter 8219. In addition, timing control circuit 8244 generates post-sync and frame enable signals which are preferably utilized by a line select circuit 8245 to generate a line select control signal via path 8254 which is subsequently preferably utilized by a data select circuit 8246 to select DATA A from transmitter 8202a or DATA B from transmitter 8202b; DATA A and DATA B, as previously mentioned, being identical in content but 180° out of phase in timing relationship. Timing control circuit 8244 also preferably generates the start bit which is preferably as described in the aforementioned copending U.S. patent application. The selected data with the inserted bit is provided via path 8255 to a sync insertion circuit 8248 to provide the composite video signal output via path 8253. The sync pulses which are provided to the insertion circuit 8248 are supplied by the TV sync generator 8243 and preferably provide all of the conventional standard vertical and horizontal synchronizing pulses that are normally present on a standard TV signal. The frame enable signal provided to the line select circuit 8245 is preferably timed to allow exactly 235 data lines per TV field. This insures that preferably no data lines are transmitted during the normally blanked periods of television transmission. It also insures that preferably at least three empty lines are pesent after vertical blanking but prior to data transmission. Preferably, during these few preliminary blank lines the start bit is applied to the output signal by start bit insertion circuit 8247. The three empty lines having only a start bit allow the frame grabbing video terminal 28a or 28b to achieve phase lock prior to reception of data at the start of a vertical frame. Detailed function and circuit arrangements for accomplishing the functions of the aforementioned portions 8240, 8241, 8242, 8243, 8244, 8245, 8246, 8247, 8248, and 8256, which provide the various signals present on paths 8249, 8250, 8251, 8252, 8253, 8254 and 8255 shall be described in gtreater detail hereinafter with reference to FIG. 4 and 5 which are detailed schematic diagrams of the preferred embodiment of the master combiner synchronizer 8204 portion of the preferred cable head 13 of the present invention shown in FIG. 1.

"Master Combiner Synchronizer Portion"

Detailed Description

Figure 4:
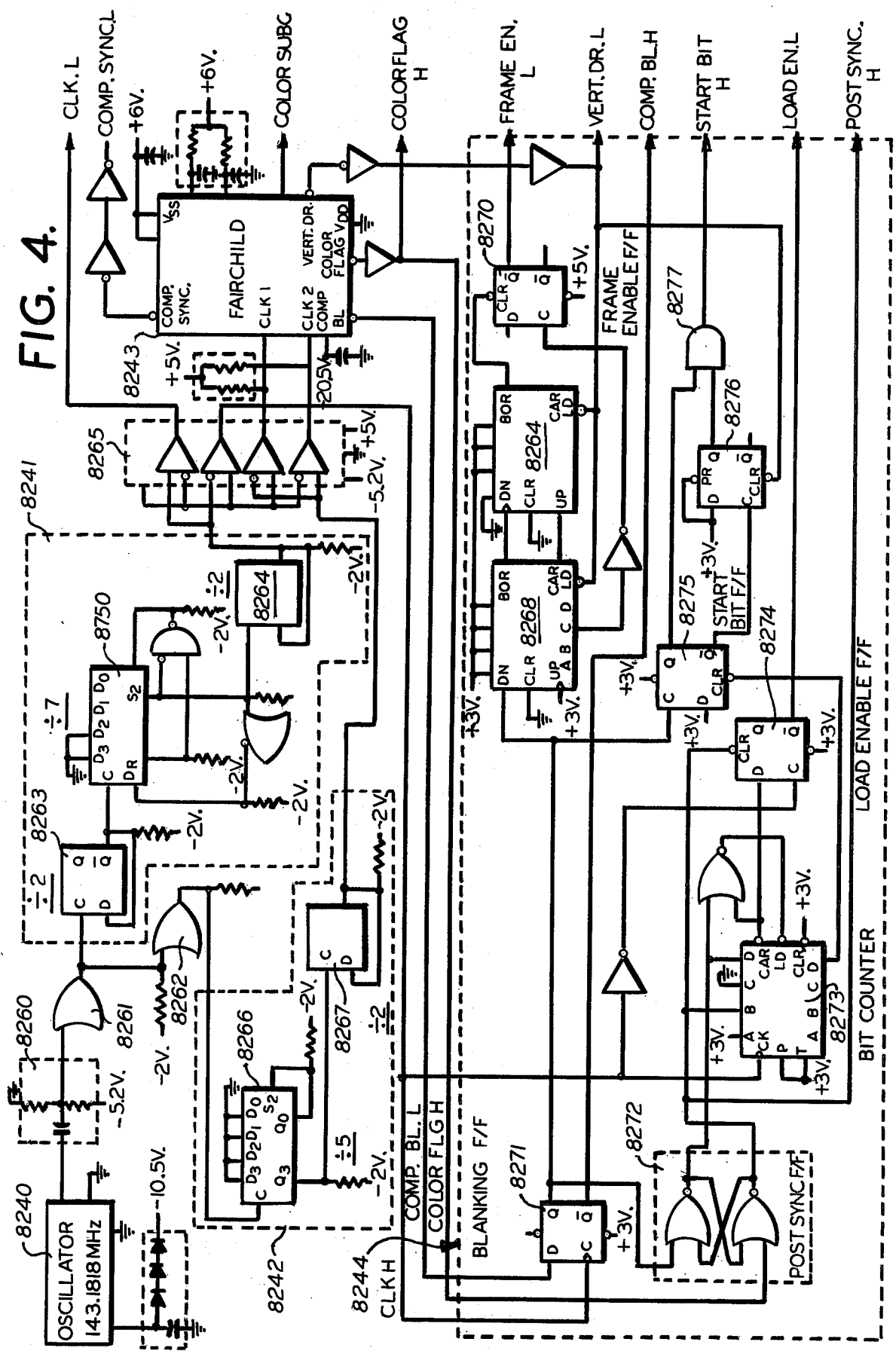
FIGS. 4 and 5 taken together comprise a logic schematic diagram of the master combiner synchronizer portion of FIG. 3.
Figure 5:
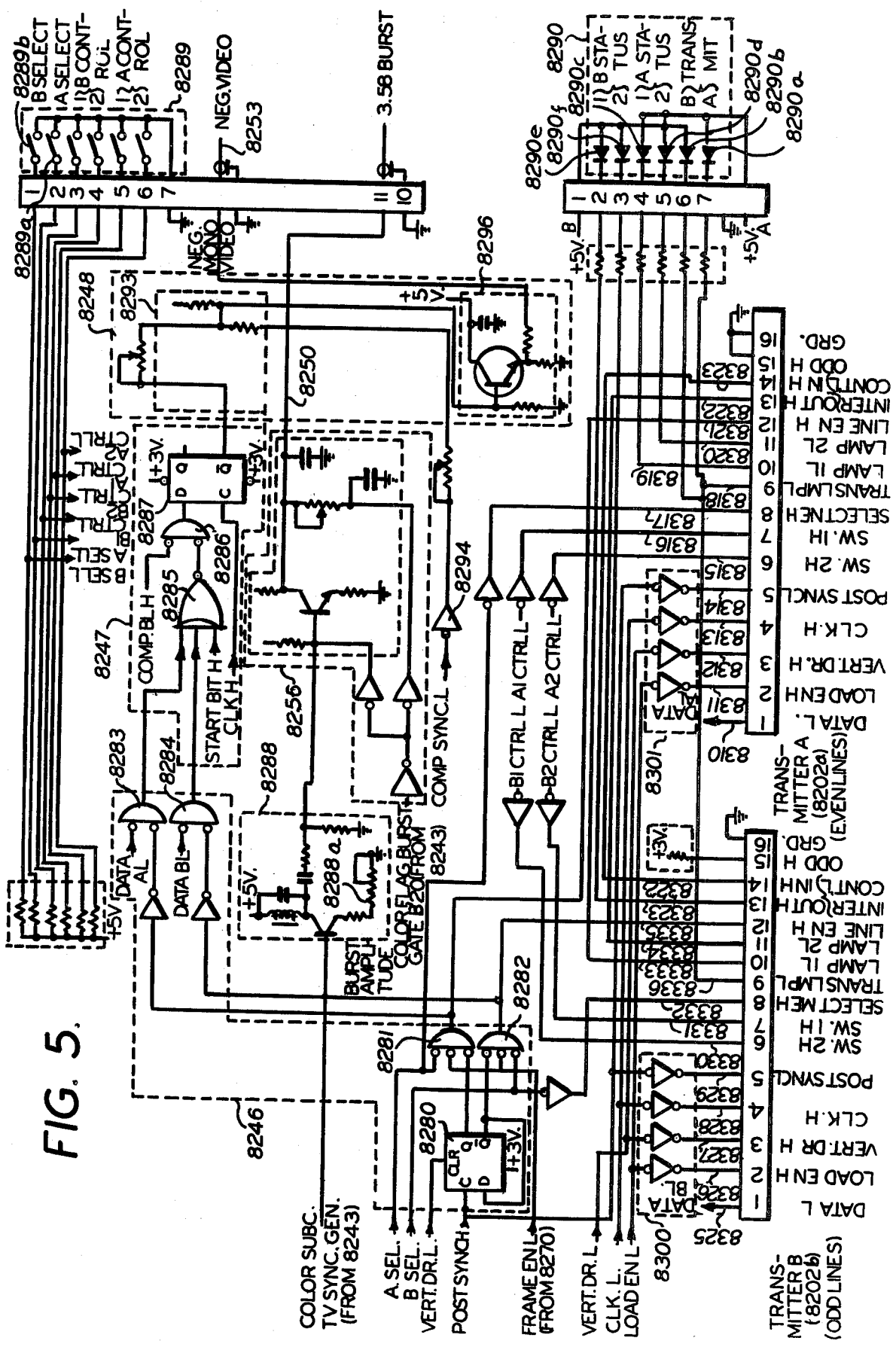
Figure 10:
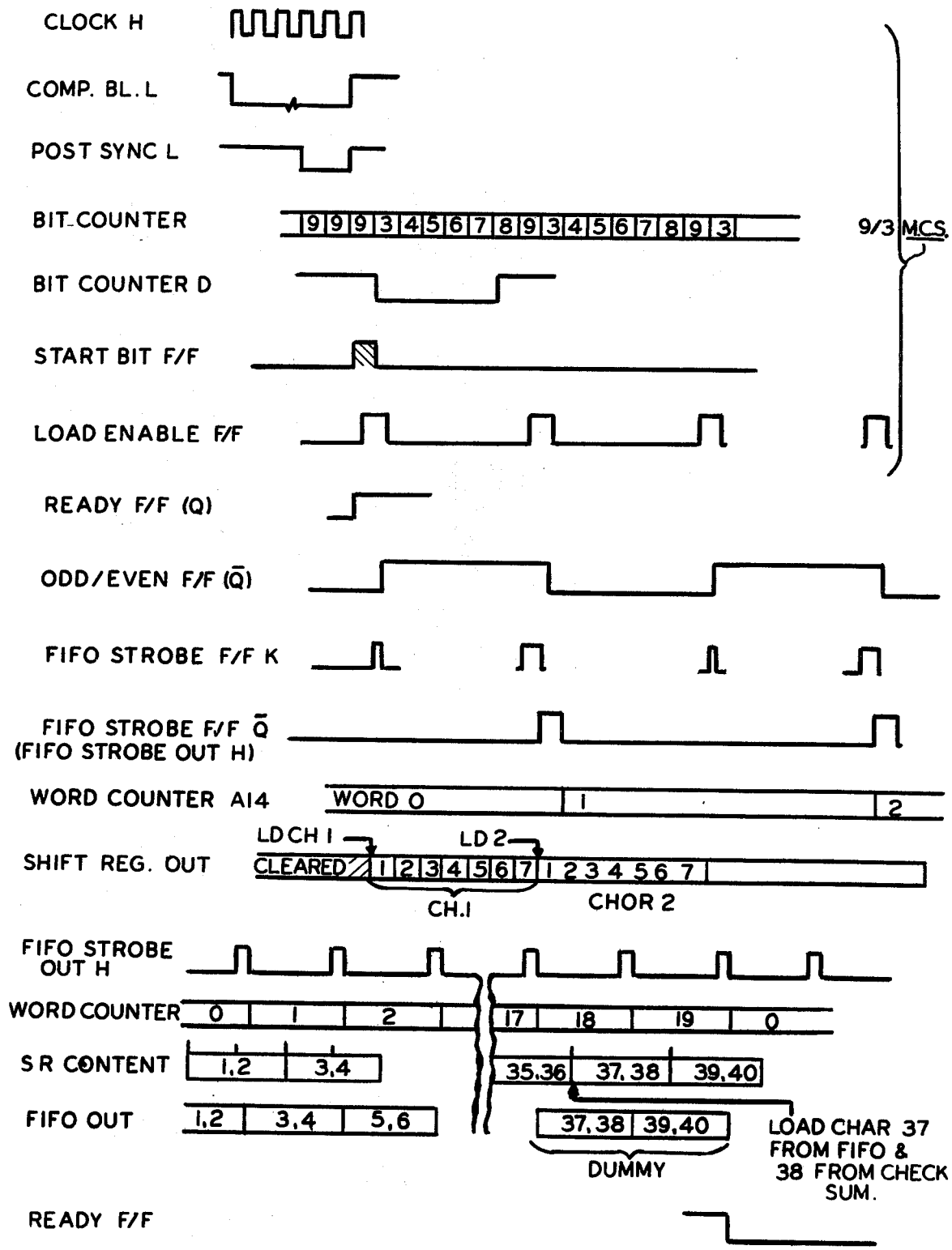
FIG. 10 is an illustrative timing diagram of the various waveforms present in the cable head portion of the system of FIG. 1.
Figure 12:
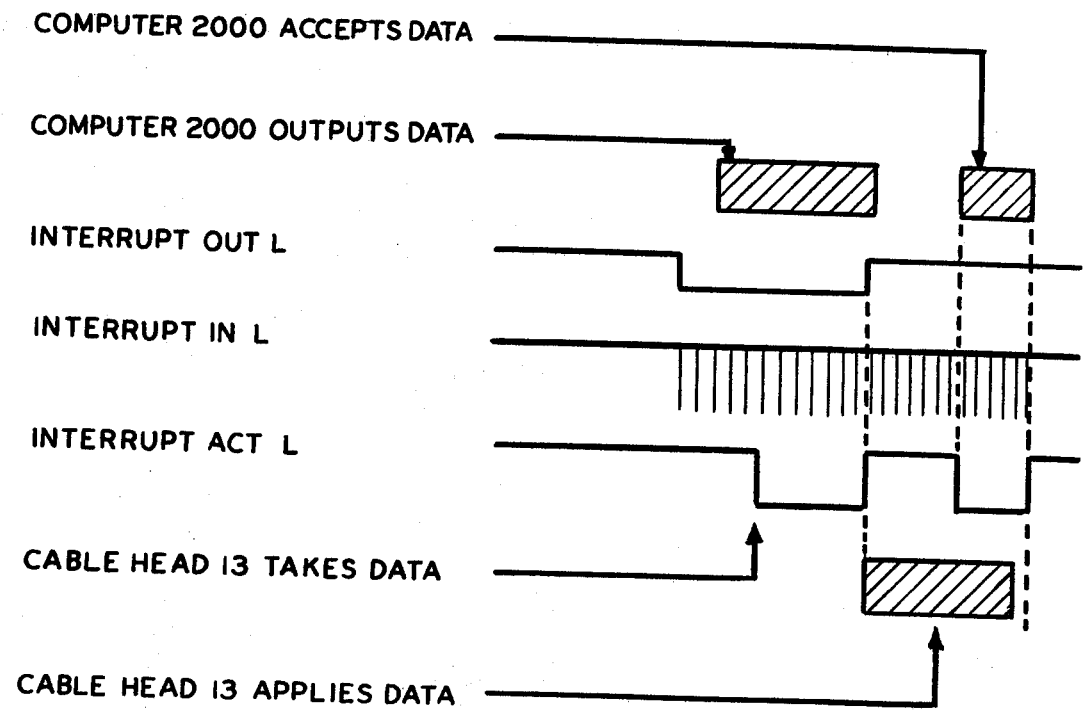
FIG. 12 comprises a timing diagram graphic illustration of the various waveforms present in the cable head portion of the system of FIG. 1.

Referring now to FIGS. 4 and 5, which taken together comprise a detailed schematic diagram, partially in logic block, of the preferred embodiment of the master combiner synchronizer portion 8204 of the preferred cable head 13 of the present invention, this portion 8204 shall now be described in greater detail. As previously described with reference to FIG. 3, 8240 is the master synchronizing oscillator which preferably operates at 143.1818 megahertz, and which is preferably a conventional crystal oscillator. The output of the oscillator 8240 is preferably coupled via a level shifting network 8260 to a buffer gate 8261. The buffered output of the oscillator 8240 is provided to a flip-flop 8263 which preferably divides the frequency by two and provides this frequency divided to a counter 8750. This counter 8750 with its associated feedback network preferably provides a division by 7. The output of counter 8750 is preferably provided to another divide-by-2 flip-flop 8264. Thus, the total division of the oscillator 8240 output amounts to a divide-by-28, and, accordingly the output frequency of flip-flop 8264 is 1/2 of 143.1818 1/28 megahertz oscillator frequency. This establishes the aforementioned 5.113 megahertz signal which is preferably provided as the system data clock. The 143.1818 mmegahertz signal at the output of buffer 8261 is also preferably fed via another buffer 8262 to a divide-by-5 counter 8266. The output counter 8266 is preferably connected to a divide-by-2 flip-flop 8267 to provide at its output a frequency of 14.31818 megahertz which is 1/10 of the oscillator 8240 frequency and is the preferred clock frequency for the TV sync generator 8243, counter 8266 and flip-flop 8267 comprising divide-by-10 network 8242. Preferably all of the aforementioned circuits comprising networks 8241 and 8242 as well as level shifter 8260 and buffers 8261 and 8262, are MECL integrated circuits of the Motorola 10,000 series, by way of example, although other equivalent functioning logic could be utilized. Thus, a buffer and level shifter 8265 which serves to convert the MECL levels of the aforementioned logic to standard TTL levels which are preferably required by the subsequent logic circuitry comprising the preferred master combiner synchronizer portion 8204, is provided, since such subsequent logic is preferably either TTL or TTL compatible logic although, if desired, other equivalent functioning logic could be utilized in place thereof. The level shifter 8265 preferably provides the 14.31818 megahertz clock to sync generator 8243 at two opposite phases of the sync generator 8243, labeled CLK 1 and CLK 2, respectively, in FIG. 4. The sync generator 8243 is preferably a conventional integrated circuit sync generator such as a Fairchild Model No. 3262. The composite blanking signal from sync generator 8243 as well as the data clock signal from level shifter 8265 are both preferably provided to a D type flip-flop 8271. The output of flip-flop 8271 is preferably a resynchronized composite blanking signal which is delayed by one clock period from the input blanking signal. This delayed composite blanking signal as well as the color flag from sync generator 8243 are preverably provided to two inputs of a set/reset flip-flop 8272 to generate the post-sync waveform, such as the waveform illustrated in FIG. 10, by way of example. This post-sync waveform, as illustrated in FIG. 10, establishes a period of time near the end of the horizontal blanking interval and immediately preceding the start bit of a pseudo video TV scan line. A bit counter 8273 is preferably utilized to establish the start time for each character, that is the beginning of each 7 bit sequence. During the post-sync waveform the bit counter 8273 is preferably continously preloaded to a count of 9 by the data clock. At this time the carry out line of the counter 8273 is preferably high. As soon as the post-sync signal is removed, the counter 8273 is preferably reloaded to a count of 3 and then is alloed to count until the carry out is again asserted at count 9, this cycle continuing with the counter 8273 being reloaded to 3, counting to 9 and being reloaded. This preferably continues for the duration of any pseudo video TV scan line. The aforementioned carry out line of bit counter 8273 is preferably provided to the D input of a D type flip-flop 8274. This flip-flop 8274 is preferably clocked by the data clock, and, thus, has an output which is preferably asserted for 1 bit time and delayed by a ½ clock bit time from the carry out of the counter 8273. The output of 8274 is the aforementioned load enable pulse whose waveform is also illustrated by way of example in FIG. 10. Bit counter 8273 also preferably controls another flip-flop 8275 which flip-flop 8275 preferably generates the start bit, the D output of counter 8273 preferably being provided to the clear input of flip-flop 8275. Flip-flop 8275 is preferable initially clocked to a set state by the trailing edge transition of the composite blanking signal from flip-flop 8271. This transition establishes the beginning of the start bit. Preferably, one bit time later, bit counter 8273 transfers from a count of 9 to a count of 3. At that time its D output preferably goes from high to low thereby clearing flip-flop 8275 and terminating the start bit. Another flip-flop 8276 and a gate 8277 are preferably provided in order to remove the first start bit that occurs during any vertical frame as the first horizontal line in the TV frame can be a half line and it is preferably not desired to ave a start bit on such a half line. flip-flop 8276 is initially cleared by the vertical drive pulse and, in its cleared state, presents a low level to gate 8277. Thus the start pulse at the output of flip-flop 8275 cannot be passed through gate 8277 while flip-flop 8276 is cleared. After the completion of the first start bit flip-flop 8276 is set and subsequent start bits are allowed to pass through gate 8277. Counters 8268 and 8269 and another flip-flop 8270 are also provided and are preferably utilized to establish the frame enable period. The counters 8268 and 8269 are preferably initially loaded to a composite value of 239. Clock pulses which are provided subsequent to the removal of the vertical drive pulse preferably cause the counters 8268 and 8269 to decrement. Preferably, when the counters 8268 and 8269 count down to a value of 235, the C output of counter 8268 goes low and causes flip-flop 8270 to be clocked to a high state. This preferably establishes the start of the vertical frame enable period. The counters 8268 and 8269 then preferably contiue to decrement until they reach a count of zero. At that time the borrow output of counter 8269 preferably goes low and clears flip-flop 8270 preferably establishing the termination of the frame enable period. All of the aforementioned circuits 8268, 8269, 8270, 8271, 8272, 8273, 8274, 8275, 8276 and 827 preferably comprise timing control circuit 8244.

Referring now to FIG. 5, the balance of the circuitry associated with the preferred embodiment of the master combiner and synchronizer 8204 shall now be described. As shown and preferred in FIG. 5, a plurality of switches 8289 are provided to allow the operator to establish the operating mode of the cable head 13. Included in the switch set 8289 are A and B select swtiches 8289*a* and 8289*b*, respectively, which allow the operator to turn on or off either of the data channels associated with computers 2000*a* and 2000*b*, respectively. The control levels from these switches 8289*a* and

8289*b* are provided to gates 8281 and 8282. Also provided to these gates 8281 and 8282 is the frame enable signal output provided from flip-flop 8270 (FIG. 4). A third input to these three input gates 8281 and 8282 is provided from another flip-flop 8280. This flip-flop 8280 is toggled by the post-sync waveform with opposite signal levels being provided to each of the gates 8281 and 8282 in such a way that alternately one output is enabled and then the other output is enabled in synchronism with the frame enable signal provided to the gates 8281 and 8282. Each output is enabled only if its corresponding A (8289*a*) or B (8289*b*) select switch is on. The outputs of gates 8281 and 8282 preferably comprise control signals which are provided to the two transmitters 8202*a* and 8202*b* as illustrated in FIG. 1. These output control signals are utilized to authorize each transmitter portion 8202*a* and 8202*b* to process a pseudo TV scan line. The line enable signal outputs of gates 8281 and 8282 are also preferably provided to gates 8283 and 8284. These are the gates to which the data lines from the transmitters 8202*a* and 8202*b* are provided. Thus data is present alternately at the output of gate 8283 and gate 8284. These data lines are provided to two of the three inputs of a three input NOR gate 8285 along with the start bit which comes from gate 8277 (FIG. 4) and which is provided to the third input. Thus the output of gate 8285 contains the selected pseudo video data line and the start bit. The output of gate 8285 is provided to another gate 8286 which passes this signal but is also controlled by the composite blanking waveform or signal to preferably insure that no extraneous data is present during the blanking period. Thus the output of gate 8286 is the composite data line that contains all of the serial data. Because of the number of gates and logic inversions that various components of the signal have come through up to this point, there is no guaranteee at this point that all data pulses have the same width. For this reason the data is preferably resynchronized by another flip-flop 8287. Circuits 8285, 8286 and 8287 comprise start bit injection circuit 8247. At every position going transition of the data clock the D input of flip-flop 8287 is sampled to set the status of the flip-flop output. Thus the output of the flip-flop 8287 preferably follows the data input except that it is one half clock period delayed, with every data pulse being exactly of the same width. The output of flip-flop 8287 is provided to a resistor network 8293 which forms a summing network which combines the data and sync levels. The other input to the resistor summing network is the composite sync waveform from sync generator 8243 (FIG.4) which is provided via an inverter 8294. Adjustable resistors are provied at each input of the summing network 8293 so that the sync/data ratio can be precisely set. The output of the resistor summing network 8293 is preferably provided to a conventional emitter follower circuit 8296. This circuit 8296 preferably provides a low impedance, such as 75 ohms, output sufficient to drive the subsequent pre-equalization filter 8207 illustrated in FIG. 1 via the composite video provided via path 8253. Circuits 8293 and 8296 comprising sync insertion circuit 8248. The color subcarrier from sync generator 8243 (FIG. 4) is provided to a conventional transistor amplifier circuit 8288. This amplifier 8288 is preferably tuned to the 3.58 megahertz frequency of the color subcarrier and preferably has an adjustable resistor 8288a in its emitter circuit to permit adjustment of the color burst output amplitude of the amplifier 8288. The output of the amplifier 8288 is preferably provided along with the color burst flag from the sync generator 8243 to the color burst gate 8256. This gating circuit 8256 preferably consists of a conventional transistor amplifier so connected that the amplifier can be turned off by the color burst flag. Thus its output consists of a burst of the color subcarrier which occurs during the time established by the color burst flag. This output, which is provided on path 8250, is preferably provided at a low impedance to the output network 8206 as shown and preferred in FIG. 1.

The other switches of the switch bank 8289 specifically the A and B control switches 8289*a* and 8289*b*, respectively, are used to provide enabling levels to the transmitter portions 8202*a* and 8202*b*, as will be described in greater detail hereinafter. Preferably, a plurality of light emitting diodes 8290 are also provided to provide indicator signals. A and B transmit indicators 8290*a* and 8290*b*, respectively, are lit when the corresponding transmitter portion 8202*a* or 8202*b*, respectively, is transmitting data. A and B status indicators 8290*c* and 8290*d* (for A status) and 8290*e* and 8290*f* (for B status), respectively, are lit in accordance with data bits from the status register in the corresponding transmitter portions 8202*a* and 8202*b*, respectively. The derivation of the respective driving signals will be described in greater detail hereinafter.

As shown and preferred in FIG. 5, output inverters 8300 and 8301 provide buffering and inversion of the various signals provided from the portion of the master combiner synchronizer 8204 shown and described in FIG. 4. The outputs of inverters 8300 and 8301 are preferably provided to transmitters 8202*b* and 8202*a*, respectively. As used throughout the specification and drawings, the letters L or H following a waveform description refer to positive or negative logic definitions of the signal; that is, by way of example, post-sync L refers to a waveform which is at its low level during the period of post-sync, whereas post-sync H would be the high level or inversion of this signal. This is true for all of the exemplary signals defined and shown in the drawings relating to the preferred embodiment of the present invention. As shown and preferred in FIGS. 5 and 8, the various signals which are provided to and from the transmitter portions 8202*a* and 8202*b* and the master combiner synchronizer 8204 are as follows. With respect to transmitter portion 8202*a*, the respective signals which are provided between transmitter portion 8202*a* and master combiner synchronizer 8204 are the data L signal which is the data A L input to the master combiner synchronizer 8204 via path 8310, and the following signals provided via paths 8311 through 8317 from the master combiner synchronizer 8204, respectively labeled load enable H, vertical drive H, phase lock H, post-sync L, switch 2 H, switch 1 H, and select me H. The various status indicator lamps 8290*a*, 8290*c* and 8290*d* associated with transmitter 8202*a*, are preferably controlled via signals provided via paths 8318, 8319, 8320. An EVEN line enable signal is provided via path 8321 as an output signal which is the line enable H signal output of data select 8246 which is provided from gate 8324 of data select 8246. Intercontrol signals output H and input H are provided via paths 8322 and 8323, respectively, between the transmitter portions 8202*a* and 8202*b*. With respect to transmitter porion 8202*b* as shown and preferred in FIGS. 5 and 8, the respective signals provided between transmitter portion 8202*b* and the master combiner synchronizer 8204 are, respectively, the data L signal which is the data B 1 signal input to the master combiner synchronizer 8204 provided via path 8325, and respective output signals load enable H, veritcal drive H, clock H, post-sync L, switch 2 H, switch 1 H and select me H provided via paths 8326 through 8332, respectively, with the signals on paths 8317 and 8332 being the transmitter 8202a and 8202b select signals, respectively, and with the control signal for the status lights 8290b, 8290e and 8290f associated with transmitter 8202b being preferably provided via paths 8333, 8334 and 8336, respectively. An ODD line enable signal is provided via path 8335 as an output signal which is the line enable H signal output of data select 8246 which is provided from gate 8337 of data select 8246.

"TYPICAL TRANSMITTER PORTION"

Detailed Description

Figure 6:
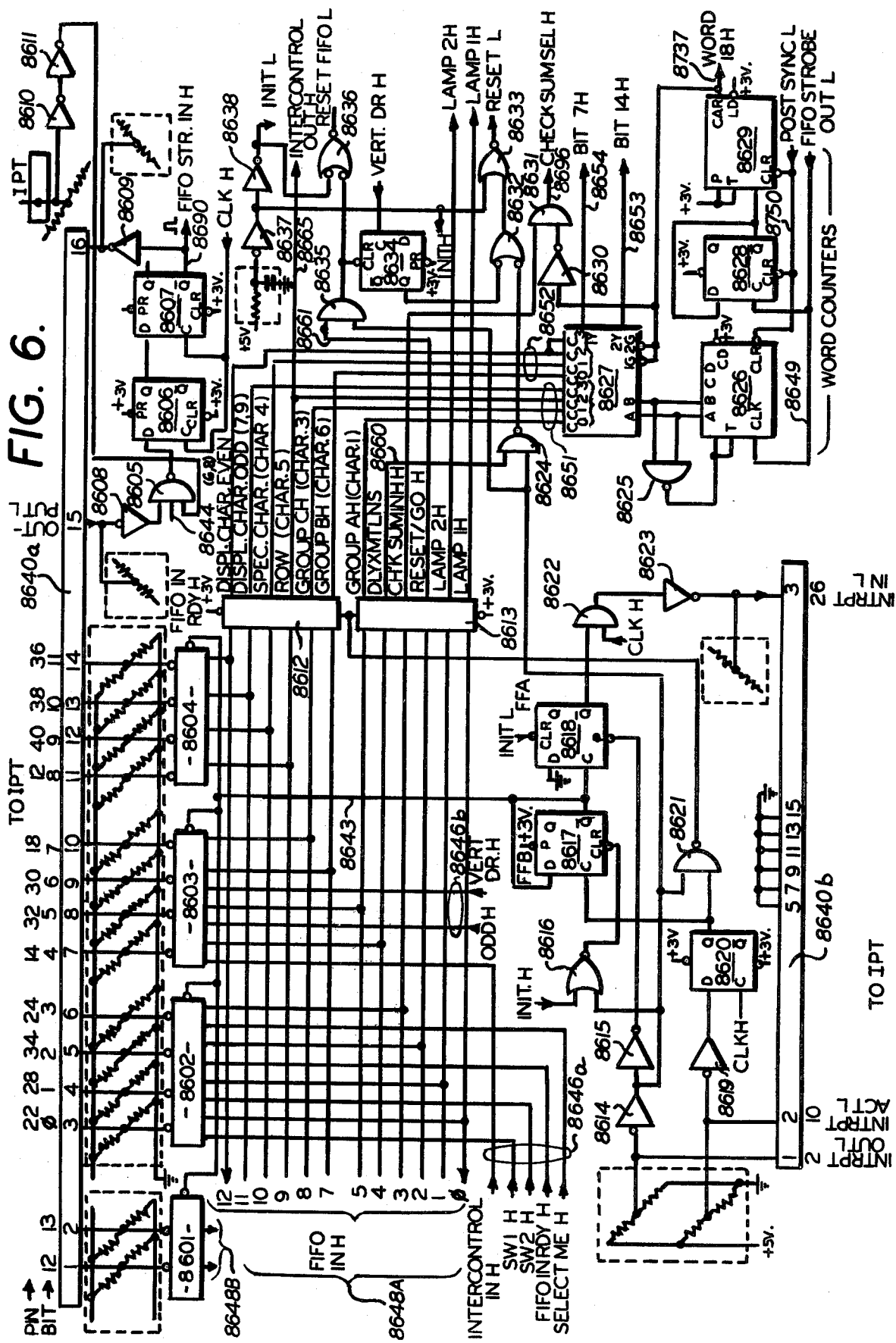
FIGS. 6 through 8 taken together comprise a logic schematic diagram of the typical transmitter portion of FIG. 2.
Figure 7:
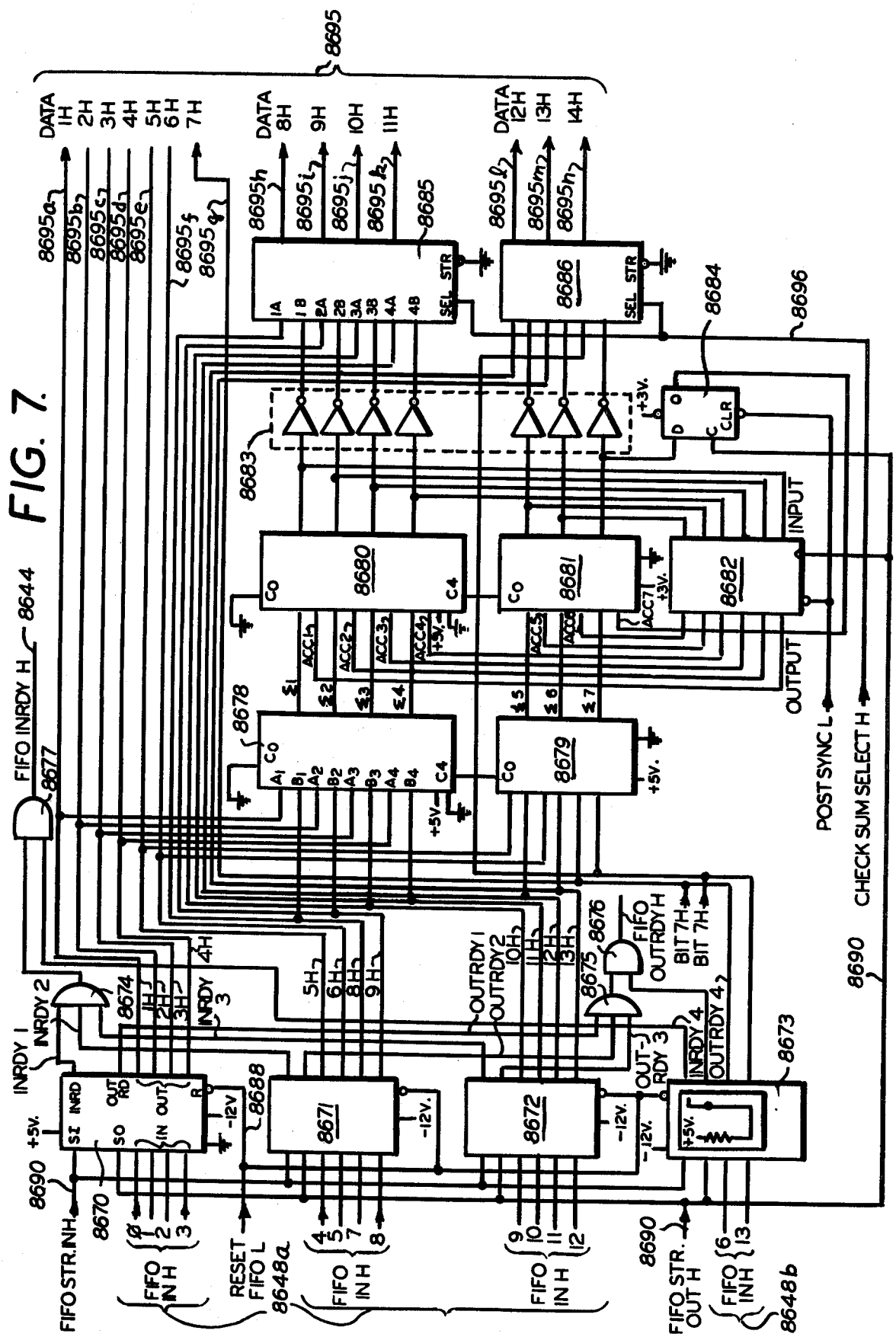
Figure 8:
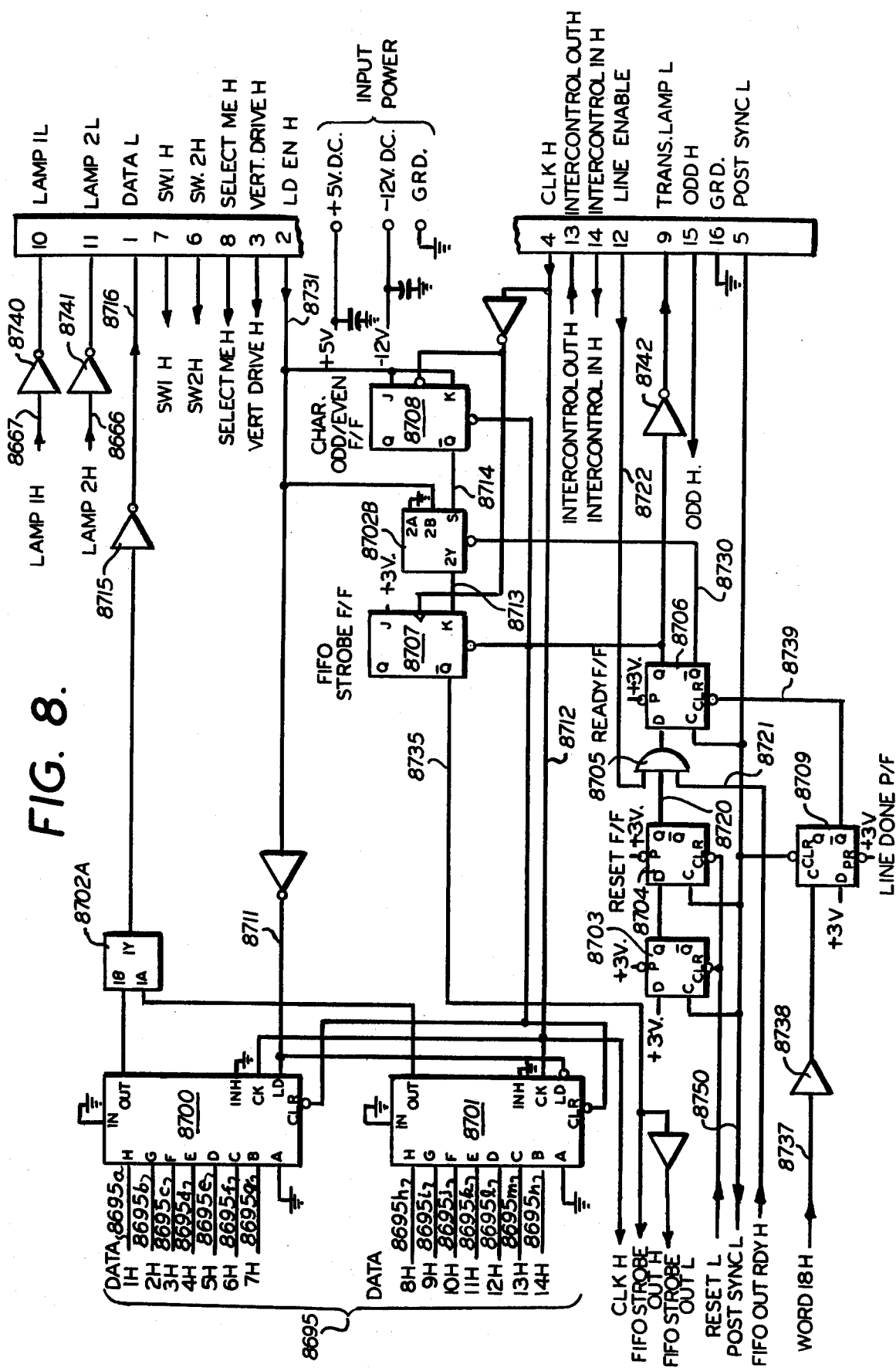

Referring now to FIGS. 6 through 8, the typical preferred transmitter portion 8202a of the preferred cable head 13 of the present invention shown in block in FIG. 1, shall now be described in greater detail, the other typical preferred transmitter 8202b comprising the preferred cable head 13 preferably being identical in function and operation with transmitter portion 8202a as previously mentioned. FIG. 6 shows those portions of the transmitter circuit 8202a which receive data from the conventinal computer 2000a. Connectors 8640 shown illustratively in two parts labeled 8640a and 8640b, respectively, interconnect the transmitter 8202a with the associated computer 2000a. This connector 8640 is used for both the input and output lines. Data from the computer 2000a is preferably fed on parallel lines in either a 12 bit or a 14 bit configuration depending on which type of computer is utilized. Integrated circuits 8601 through 8604 which are conventional line transceiver circuits are provided and serve to receive data from the computer 2000a or to transmit data back to the computer 2000a depending upon which mode the transmitter 8202a is operating in. As was previously described, data transfer takes place in either of two modes; one mode is a direct memory access mode wherein data is fed continuously at maximum rate from the computer 2000a memory unit directly to the transmitter 8202a and the other mode is the status transfer mode which is utilized primarily for single word transfers in both directions. In both modes certain control and acknowledgment signals are preferably required between the computer 2000a and the transmitter 8202a to establish valid times for receiving and returning data.

Considering first the direct memory access mode, a control signal from the computer 2000a is preferably applied to an inverter 8608 to initiate this mode of operation. This signal is preferably asserted when the computer 2000a is ready to transmit data by direct memory access. A NAND gate 8605 is provided which is an enabling gate which receives the ready command from an inverter 8608 and also has a second enabling input provided thereto from the transmitter 8202a first in-first out buffer via path 8644. This circuit will be described in greater detail hereinafter, but suffice it to say at this time that this line must be asserted before data can be received by the transmitter 8202a. A third input is preferably provided to gate 8605 from a pair of inverters 8610 and 8611 which are connected to the computer 2000a along a path which is always asserted at the time that data break is initiated and serves to terminate the data break at the proper time. With all enabling input conditions at gate 8605 met, the output of that gate 8605 preferably falls to a low level which is provided to the D input of a D type flip-flop 8606. This flip-flop 8606 is preferably clocked by the transmitter 8202a data clock and, accordingly, the output of the flip-flop 8606 falls at the initiation of the next clock pulse. Similarly, a following flip-flop 8607 preferably responds to the next succeeding clock pulse and its output is asserted at that time. This output signal is transmitted via an inverter 8609 back to the computer 2000a as an acknowledgement that the ready status of the computer 2000a has been received and, furthermore, that the transmitter 8202a is ready to accept data. The sequence of events that then follows is that the computer 2000a applies valid data to the data line received by line transceivers 8601 through 8604. At this time the controlline 8643 preferably sets the line transceivers 8601 through 8604 in their received state. In this state, the line transceivers 8601 through 8604 preferably pass data from the input to output lines which are then applied to the nput of the first in-first out buffer which will be described in greater detail hereinafter. Returning once again to the control circuit, and specifically to gate 8605, once data has been strobed into the first in-first out buffer the FIFO IN ready line 8644 drops to a low level. Preferably, after two clock delays, the acknowledgment signal to the computer 2000a has returned via inverter 8609 and is returned to its original state. This signifies that the first data word has been received by the transmitter 8202a. A second cycle of control command acknowledgement and data word reception then follows, preferably exactly in the manner described above for the first word.- This process continues as long as the computer 2000a remains in its direct memory access mode. At the completion of the data break, the DONE line from the computer 2000a, which is applied to inverter 8610, signifies that the data break has been completed and disables gate 8605. This terminates the direct memory access mode.

Control of the other mode, that is status transfer is accomplished by the interconnection between the transmitter 8202a and the computer 2000a shown at 8640b. This operation is preferably initiated by the INTERRUPT OUT line from the computer 2000a applied to an inverter 8614 being asserted. As a result of this assertion, another inverter 8615 presets a flip-flop 8618 and a NOR gate 8616 clears another flip-flop 8617. Flip-flop 8617 is connected to the clock input of flip-flop 8618 which in its preset state enables gate 8622. The data clock, which is applied to the other input of gate 8622, is then applied to the computer 2000a via the INTERRUPT IN line by way of inverter 8263. Transmission of this train of clock pulses from the transmitter 8202a to the computer 2000a is the transmitter's 8202a acknowledgement to the INTERRUPT OUT command. Preferably, at this time the computer 2000a applies a status word to the data input lines which are connected to transceivers 8601 through 8604. A control line 8643, which is connected to the output of flip-flop 8617, is preferably still in the state which sets the line transceivers 8601 through 8604 in the receive mode. Thus, the transceivers 8601 through 8604 make availabel at their output the status word and this word is applied to the inputs of conventional latches 8612 and 8613. After a short time has passed sufficient to insure that the data lines have stabilized, the computer 2000a asserts the INTERRUPT ACTIVE line going to the transmitter 8202a and received therein at an inverter 8619. The output of the inverter 8619 is preferably applied to the D input of another D type flip-flop 8620 so that at the initiation of the next subsequent clock pulse output of that flip-flop 8620 is asserted enabling a gate 8621 whose output then drops to its low state; the output of gate 8621 being fed as the strobe input to the latches 8612 and 8613, the data applied to the latches 8612 and 8613 preferably being strobed into the latches 8612 and 8613 at the falling edge of this signal. The data remains at the output of the latches 8612 and 8613 preferably until at some later time when the status word reception cycle is repeated. At this time both the INTERRUPT ACTIVE line and the INTERRUPT OUT line applied to inverters 8614 and 8619 are preferably returned to their original state under control of the computer 2000a program. This completes the status word output transfer from the computer 2000a.

Preferably, automatically and immediately following a status word output transfer from the computer 2000a, a status input transfer is accomplished. This is accomplished as follows. On the next clock pulse following return of the INTERRUPT ACTIVE line to its original state, the output of flip-flop 8620 is set at a high level. This transition applied to the clock input of flip-flop 8617 causes the output of flip-flop 8617 to change state; that is, to go from a high to a low level. This low level is preferably applied to the control line 8643 of the input transceivers 8601 through 8604 to set them in the transmit mode. In this state, the line transceivers 8601 through 8604 connect their input line 8648a and 8646b to the computer 2000a data bus through connector 8640a. The origin of these lines which provide the output status word will be described in greater detail hereinafter. Suffice it to say at this time that we have thus far described how under the direct memory access mode, data is received from the computer 2000a and applied to the FIFO input lines 8648; that during a status output transfer the computer 2000a output status word is latched into buffers 8612 and 8613 and made available at the output of these latches 8612 and 8613; and that during a status input transfer to the computer 2000a, the data on lines 8646 is applied to the computer 2000a data bus. It should be noted that line transceiver 8601 is preferably utilized only when the transmitter 8202a is fed from a 16 bit computer; when a 12 bit computer is utilized instead for computer 2000a, transceivers 8602 through 8604 process the 12 bits and line transceiver 8601 is not needed. Furthermore, when a 12 bit computer is utilized, one 12 bit word is preferably utilized to transfer two 6 bit characters. The transmitter 8202a preferably has the capability of operating with 7 bit characters. A unique feature of the present invention is that it provides a capability to generate a seventh bit for at least certain characters by use of the status word. This feature generally is useful only when it is desired to set the seventh bit of some character at a value and to leave it at the same value for a very large number of consecutive character transmissions. This is precisely the situation that is often required for setting up a seventh bit for group addresses and for special characters in the row grabbing system described in the aforementioned copending U.S.-patent application. The particular bits which are used for seventh bit generation are preferably connected from the status word latches 8612 and 8613 to a multiplexer 8627 and are preferably selected by the multiplexer 8627 to be made available at the correct time at the output of the multiplexer 8627.

Now describing the circuit components that do the word counting as necessary to control the multiplexer 8627. One of the preferred basic functions of the transmitter 8202a is to format the words received by the computer 2000a into serial output data packets which contain 38 characters. These packets comprise the data content of the pseudo video scan lines. Since the first in-first out buffer is preferably loaded with words which consist of two characters each it is necessary to preferably count 19 outputs of the FIFO to determine the completion of one data packet. Conventional word counters consisting of 8626, 8628 and 8629 accomplish this counting. At the beginning of any television scan line all counters 8626, 8628, and 8629 are cleared by the post-sync pulse provided via path 8750. Everytime a word is transferred out of the FIFOs, a clock pulse is made availabel for the counters 8626, 8628 and 8629 on line 8649. When counter 8626 is set at count 0, that is its initial condition, multiplexer 8627 preferably selects the C 0 input line from the plurality of inputs 8651 to multiplexer 8627 and applies it to one output 8653 thereof. At the same time, it selects the C 0 input to multiplexer 8627 from the plurality of inputs 8652 and applies it to the 8654 output line. Preferably when the first word has been strobed out of the FIFO, counter 8626 advances to count 1 and the multiplexer 8627 selects line C 1 of plurality 8651 to be connected to output 8653 and selects also line C 1 of plurality 8652 to be applied to output line 8654. This process continues up to a count of 3 when, at the same time a gate 8625 applies a low level to the enabling inputs of counter 8626 and halts its counting operation until it is recleared at the start of the next television scan line. As a result, the multiplexer inputs C 3 of 8651 and 8652 are connected to the two output lines 8653 and 8654, respectively, for the remainder of the television scan line. As a result of these connections, it is possible for the computer 2000a to establish unique bit assignments for the seventh bit of each of the initial address characters and to establish a fixed bit assignment for all of the data characters. Odd and even data character 7 bits, however, are preferably selected separately so that the result is that the seventh bit of all odd data characters will have one value and the seventh bit of all even data characters will have a value which may be the same or different as that of the odd characters.

The remaining circuit components shown in FIG. 6 are preferably utilized to establish initialization and reset conditions, such as the input circuit to an inverter 8637 which with a subsequent inverter 8638 is utilized to provide a negative initialization pulse when power is first turned on. As a result, initialization pulses are made available at the output of inverter 8638, at the output of a gate 8636, and at the output of a NOR gate 8633. Means is also provided for a reset pulse to be generated under computer 2000a control. This is accomplished during data output transfer by the computer 2000a setting the bit of the status word that ends up on line 8653 applied to NAND gate 8635. As a result of the signal on line 8661, a reset pulse is generated by NAND gate 8635 during every status transfer, during which time the other input to gate 8635 also goes high. Thus, as long as the line 8661 remains high, reset pulses will be continuously generated. Normally the status word is preferably set to cause a reset on one status transfer, a reset pulse having been created thereby as previously mentioned, the reset bit being cleared on the subsequent status word transfer. The reset pulse from gate 8635 preferably causes a FIFO reset from gate 8636 and causes flip-flop 8634 to be cleared. With flip-flop 8634 cleared, a reset assertion is made at the output of gate 8632 and appears at the output of gate 8633 as a master reset pulse labeled RESET L. This particular reset pulse is preferably removed at the start of the next vertical drive period by flip-flop 8634 which is preferably clocked to its set state at the start of the vertical drive pulse provided at the clock input of flip-flop 8634. A slightly different form of reset under computer 2000a control is preferably accomplished when the computer 2000a sets the bit of the status word associated with line 8660. With this bit set, gate 8624 applies a negative reset pulse to gate 8632 during every status word transfer. In similar manner as in the previously described reset mode, a reset negative level is preferably provided at the output of NOR gate 8633. In this case, the reset is under direct control of the status word bit, whereas when the reset was generated by flip-flop 8634, the reset condition once started was maintained until the start of a vertical drive pulse. The reset associated with flip-flop 8634 is preferably utilized when it is specifically desired to halt transmission of data characters and to resume transmission at the start of the next vertical field. The status output bits labeled, respectively, INTERCONTROL OUT H, LAMP 2H, and LAMP 1H, on lines 8665 through 8667, respectively, are preferably utilized for signal indication and control purposes which will be described in greater detail hereinafter.

Referring now to FIG. 7, character input data is preferably applied via lines 8648a and 8648b to FIFOs 8670 through 8673. The FIFOs 8670 through 8673 are initially cleared by the reset line 8688. Data is strobed into the FIFOs 8670 through 8673 by the FIFO strobe line 8690 which is generated by flip-flop 8607 (FIG. 6). The FIFOs 8670 through 8673 preferably have capacity for storing 64 words. After the FIFOs 8670 through 8673 have been cleared and at least one word has been strobed in, data shortly becomes available at the FIFO output line. Availability of data at the output is signalled by the OUTPUT READY lines which are connected to gate 8675 and 8676. Thus, a high level at the output of gate 8676 indicates that all FIFOs 8670 through 8673 have valid output data available. Similarly, each FIFO 8670 through 8673 has a line which indicates that its input is ready to receive data. The INPUT READY lines are preferably connected to gates 8674 and 8677 such that the output of gate 8677 is high when the inputs of the FIFOs 8670 through 8673 are ready to receive data. The function of the INPUT READY high line 8644 was previously described in relation to the portion of the transmitter 8202a shown in FIG. 6.

The circuits consisting of components 8678 through 8686 are preferably utilized for the purpose of computing and inserting a check sum at the end of a data packet. These circuits 8678 and 8679 are preferably conventional binary adders which are connected to add two 7 bit numbers. The bits of one number are preferably connected to the A inputs and the bits of the other number are preferably connected to the B inputs. The 7 bit sum is then available at the output lines. The units are preferably connected so a carry is correctly propagated from the least significant bit to the most significant bit; however, no carry output is generated. As shown and preferred, the adders 8678 and 8679 add together the two 7 bit characters which are always available at the 14 bit output lines of the FIFOs 8670 through 8673. Thus to start with, character 1 is added to character 2 to make their sum available at the output; then, after the next word is available at the FIFOs 8670 through 8673, character 3 is added to character 4, and so forth. This operation preferably continues for the duration of each data packet. Circuits 8680 and 8681 are also preferably binary adder circuits identical to adders 8678 and 8679. These adders 8680 and 8681 add the previous sum made available by adders 8678 and 8679 to another 7 bit number which preferably comes from a conventional storage latch 8682. For the purpose of discussion it is assumed initially that the output of latch 8682 is zero. In that case, the summation outputs of adders 8680 and 8681 are the same as the input values. Thus at the time just prior to the strobing of characters 2 and 3 out of the FIFOs, the sum of characters 1 and 2 is available at the output of adders 8680 and 8682. At the occurrence of the first FIFO strobe output on line 8690, two things happen simultaneously. First, the output of adders 8680 and 8681, namely the sum of the first two characters, are latched into buffer latch 8682 and made available at the output line of that circuit 8682. Then, the second and third characters are made available at the output of the FIFOs 8670 through 8673. As a result, at this time, connected to the input of adders 8680 and 8681, are the summation of characters 1 and 2 on one set of inputs and the summation of characters 3 and 4 on the other set of inputs. This results in, at the output of these adders 8680 and 8681, the presence of the total summation of characters 1, 2, 3 and 4. Thus, as the line progresses, at all times available at the output of adders 8680 and 8681 is the total accumulated sum of all characters transmitted up to that point. Preferably, after characters 37 and 38 have been strobed out of the FIFOs, the output of adders 8680 and 8681 represents the check sum of the 38 characters processed up until that time. Actually, as presently preferred, the last data character is character number 37. However, since characters are preferably handled inpairs, a dummy 38th character is included in the addition but the computer 2000a sets that dummy character to a value of zero. Thus, the summation represents the addition of characters 1 through 37. A plurality of inverters 8683 preferably form the ones complement of the check sum and provide it at the input lines of conventional multiplexers 8685 and 8686. These multiplexers 8685 and 8686 preferably serve to switch these check sum lines onto the output data lines n place of the FIFO data at the precise time necessary for the check sum to be picked up as the 38th output character. As a result, the 14 output lines 8695a through 8695n represent the character pairs necessary to form the proper final output data including the check sum. The switching of these multiplexers 8685 and 8686 is preferably accomplished by the control line 8696 labeled CHECK SUM SELECT H. This line 8696 is preferably asserted at the 18th count of the word counter 8629 (FIG. 6) which signal would then be present at the output of gate 8631 (FIG. 6).

Referring now to FIG. 8, conventional shift registers 8700 and 8701 are preferably provided to convert the 14 bit parallel input data provided via lines 8695a-8695n into serial data as necessary for final transmission. A negative pulse on line 8711 which preferably occurs once per character, preferably latches the parallel input data provided via 8695a-8695n into the shift registers 8700 and 8701. This data is then preferably shifted out serially under control of the 5.1 megahertz system clock provided via line 8712. A conventional multiplexer 8702, illustratively shown in two sections 8702a and 8702b is provided, with section 8702a connecting the output data line alternately to the output of one or the other of the shift registers 8700 or 8701. The multiplexer 8702 is preferably switched at the character rate by control line 8714 which is shown connected as the control input to the other section 8702b of the multiplexer 8702. The output data from section 8702a is preferably connected to an inverter 8715 which makes the final output data available on line 8716. The other circuits shown in FIG. 8 are preferably utilized to generate control waveforms necessary to operate the various circuits of the transmitter 8202a already described. Flip-flops 8703 and 8704 are preferably provided to generate an initial delay after the FIFOs 8670 through 8673 first have data available. Inasmuch as data is preferably shifted out at a fixed rate for one television scan line period, preferably it is desired to insure that the FIFOs are adequately loaded with data before a line transmission is initiated. Flip-flops 8703 and 8704 thus provide an initial delay after reset equivalent to two television scan line periods which is an adequate time to insure that the computer 2000a has loaded the FIFOs 8670 through 8673 with adequate data. A three input gate 8705 is provided which tests its input lines 8720, 8721 and 8722 to determine if all conditions are met for initiating the transmission of a data packet. If the system is still in reset, as indicated by a signal present on line 8720, if the FIFOs output are not ready as indicated by a signal present on line 8721, of if the LINE ENABLE is not asserted on line 8722, the output of gate 8705 will be low and the system will be inhibited from transmitting a data packet. The aforementioned LINE ENABLE line 8722 is the one that selects which of the two transmitters 8202a or 8202b is used for a particular television scan line.

When all conditions necessary for transmission are present, the output of gate 8705 goes high and at the trailing edge of the next post-sync pulse, provided via line 8750, flip-flop 8706 is set. This flip-flop 8706 preferably initiates a transmission sequence by removing the clear condition from the shift registers 8700 and 8701 and from flip-flops 8707 and 8708, the FIFO flip-flops, and the character ODD/EVEN flip-flop. One output of flip-flop 8706 preferably enables the multiplexer 8702b via path 8730. Flip-flop 8708 is preferably toggled at the character rate to generate the select input for mulitplexer 8702 on control line 8714. The LOAD ENABLE waveform is connected to both the J and the K inputs of J-K flip-flop 8707 via line 8731. This pulse on path 8731 is preferably one clock period long. Thus, the flip-flop 8708 is toggled at the negative clock transition which occurs during the LOAD ENABLE pulse. The output of flip-flop 8708 provided via line 8714 is preferably high during odd character periods and low during even character periods. One input of multiplexer section 8702b is preferably connected to the LOAD ENABLE line 8731 while the other input is grounded. Therefore, the output of this multiplexer section 8702b which is provided via line 8713 consists of alternate LOAD ENABLE pulses. Thus output line 8713 is preferably connected to the K input of flip-flop 8707. As a result, the output of flip-flop 8707, which is provided via line 8735, is set high at the completion of the last bit of each odd character and remains high during the first bit of the subsequent even character. Thus, this line 8735 is high during the first bit of even characters 2, 4, 6, etc., and is low at all other times.

Preferably, at the completion of an active television scan line, the transmit sequence is terminated by the word 18 pulse which is provided via line 8737. This is preferably applied to the clock input of the LINE DONE flip-flop 8709 via an inverter 8738. As a result, at the completion of word 18, flip-flop 8709 is set and its output provided via path 8739 goes low, clearing the READY flip-flop 8706. The output of flip-flop 8706 then returns to its original quiescent state. It should be noted that in the preferred example being described herein, the completion of the word 18 pulse corresponds to the completion of dummy character number 40. This is because the word 18 pulse actually is present during words 18 and 19, and as shown in FIG. 10, the completion of word count 19 preferably occurs when characters 39 and 40 are present at the FIFOs output. As further shown and preferred in FIG. 8, inverters 8740, 8741 and 8742 are provided as lamp drivers to provide power to the signal indicator lamps via signals LAMP 1 L, LAMP 2 L, and TRANS, LAMP L, respectively.

As was previously mentioned, the function and operation of transmitter portion 8202b is preferably indentical with that described above with reference to the function and operation of transmitter portion 8202a, described in detail above. As was also previously mentioned, these tramsitter portions 8202a and 8202b preferably provide serial data unidirectionally to the master combiner synchronizer 8204 as well as receiving and transmitting bidirectional status and control signals to the master combiner synchronizer 8204. The output of the master combiner synchronizer 8204, which was previously described in detail with reference to FIGS 4 and 5, is the composite video signal and a separate color burst signal both of which are provided to the output network 8206, as shown and preferred in FIG. 1. The function and operation of this output network 8206 for providing a well defined controllably distorted output signal of the type represented by the waveform illustrated in FIGS. 11C and 11E shall now be described in greater detail hereinafter with reference to FIGS. 9 and 11A through 11E.

Pre-Post Equalization of a CATV Channel

As was previously described in the commonly owned copending U.S. patent appliction "Improved Row Grabbing System", filed Sept. 10, 1975 and bearing U.S. Ser. No. 611,843, and as particularly illustrated in FIGS. 21A through 21C thereof, data to the receiver terminal 28a or 28b may contain significant distortion resulting from conventional vestigal sideband modulation schemes utilized for the preferred CATV transmission as well as from phase delay distortion present in any cable or CATV transmission system and the bandwidth limitations inherent in the FCC channel allocations. These distortions generally occur in any television transmission and are not normally compensated for due to the low level fidelity requirements of conventional television transmission and display. The nature of these types of distortions was described in the aforementioned U.S. patent application and illustrated in FIGS. 21A through 21C thereof. FCC channel allocations normally provide for equalization with respect to conventional television transmission; however, this equalization is not sufficient for the type of digital data transmission which is accomplished by the preferred system of the present invention and, thus, the aforementioned distortions occur. The preferred equalization system of the present invention which, as will be described in greater detail hereinafter, preferably takes place in output network 8206, as well as in the preferred RF demodulator/equalizers 8850a and 8850b which are preferably identical channel type dedicated equalizers, omits the need for the distortion compensation cirucit of the type described in the aforementioned U.S. patent application.

Figure 9:
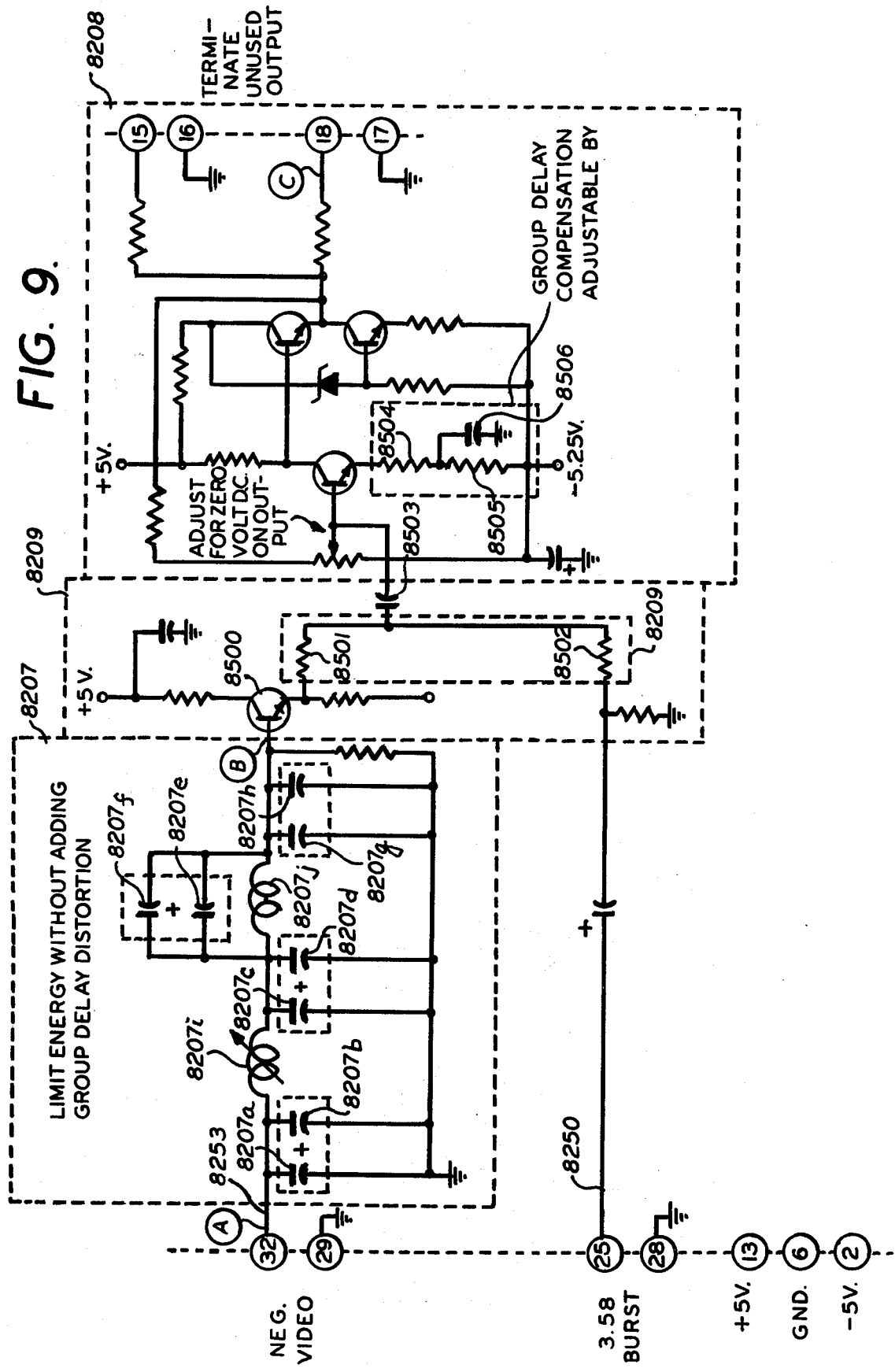
FIG. 9 is a schematic diagram of the output network of FIG. 1.

Referring now to FIGS. 9 and 11A through 11E, the output network 8206 shown in block in FIG. 1, shall now be described in greater detail with reference to the schematic of FIG. 9. The illustrations of the various exemplary waveforms present throughout the output network 8206 shown in detail in FIG. 9 are shown in FIGS. 11A through 11E. FIGS. 11A through 11C refer to the various exemplary waveforms present at points A, B and C (FIG. 9), respectively in the output network 8206. FIG. 11D refers to the exemplary energy distribution of the waveform illustrated in FIG. 11A and FIG. 11E refers to the exemplary energy distribution of the waveforms illustrated in FIGS. 11B and 11C, the energy distribution of the waveforms illustrated in FIG. 11C being the same as that of the waveform illustrated in FIG. 11B. The preferred pre-equalization filter network 8207 is preferably utilized in output network 8206 to limit the energy content of the composite video input data signal, illustratively represented by the waveform of FIG. 11A, and provided via path 8253 to filter 8207 at point A, without adding any significant group delay distortion. This pre-equalization filter 8207 produces an output signal at point B from the input waveform of FIG. 11A which output signal is represented by FIG. 11B. The waveform of FIG. 11B preferably has an energy distribution of the form illustrated in FIG. 11E. Thus, as can be seen by comparing FIG. 11D, the energy distribution of the input waveform of FIG. 11A, and FIG. 11E, the energy distribution of the output waveform of FIG. 11B, the energy distribution of the signal provided at the output of pre-equalization filter 8207 is preferably brought well within the restrictions of the CATV transmission system being utilized. Thus, this signal present at the output of filter 8207 will not be significantly distorted by the CATV transmission system utilized with respect to the band limiting distortions which would normally occur in the absence of the pre-equalization filtering function of filter 8207. As shown and preferred in FIG. 11B, this output signal as compared to the input waveform of FIG. 11A is a controllably distorted digital signal well defined in accordance with the characteristics of the preferred filter network 8207 to be described in greater detail hereinafter.

As shown and preferred in FIG. 9, the output of the preferred filter network 8207 is provided to the base of a buffer amplifier 8500, which is preferably a conventional transistor amplifier, which prevents overloading of filter 8207 in conventional fashion. This buffer amplifier 8500 preferably feeds one input to mixer or summing network 8209 such as one preferably comprising resistors 8501 and 8502, with the other input to the mixing network 8209 preferably being the color burst signal provided via path 8250 through resistor 8502. The output of the summing network 8209 is preferably provided through a capacitor 8503 which conventionally provides AC coupling into the AC coupled output amplifier comprising the video driver 8208. Amplifier or video driver 8208, preferably contains a group delay equalizing network comprising resistors 8504, 8505 and capacitor 8506. Network 8504-8505-8506 preferably compensates for the distortion introduced by envelope detection of vestigal sideband TV demodulation. Thus, network 8504-8505-8506 preferably introduces the specific type of distortion required for the RF demodulator/equalizer 8850a and 8850b used for a given channel in the CATV transmission system utilized. The output of the video driver 8208 which is illustratively represented by the waveform of FIG. 11C, thus preferably contains further controllable distortions therein. These further controllable distortions which are now preferably present in the waveform of FIG. 11C, when passed through the cable TV television distribution system in which signal distortions of the type which normally result from the vestigal sideband modulation and demodulation process occur, and through the RF demodulator/equalizer 8850a and 8850b associated with the channel, result in the waveform of the type illustrated in FIG. 11B at the output of the RF demodulator/equalizer 8850a or 8850b. Thus, when the distortions which normally occur due to this vestigal sideband modulation and demodulation occur on or are combined with the signal of the type illustrated in the waveform of FIG. 11C, it preferably results in the output waveform illustrated in FIG. 11B at the output of the preferred RF demodulator/equalizer 8850a or 8850b. The configuration of the preferred video amplifier or driver 8208 is preferably a conventional video amplifier of the type utilized in a television distribution system but which has been modified to the extent previously described with reference to the network of 8504-8505-8506. The aforementioned filter network 8207 is preferably a conventional $\sin^2$ filter configuration with the values being chosen so as to preferably limit the energy without adding group delay distortion, as previously mentioned. These values are typically, by way of example, 370μf for the sum of capacitors 8207a and 8207b, 2000μf for the sum of capacitors 8207c and 8207d, 272μf for the sum of capacitors 8207e and 8207f, 250μf for the sum of capacitors 8207g and 8207h, 5.5 to 8.4μh for variable inductor 8207i and 1.8μh for inductor 8207j, and produce a half pulse response whose half amplitude duration is preferably, by way of example, 147 nanoseconds. Thus, output network 8206 as a result of the functioning of filter 8207 and the functioning of network 8504-8505-8506 in video driver 8208, preferably provides a well defined controllably distorted output at point C, illustratively represented by waveform FIG. 11C having a well defined controlled energy distribution, illustratively represented by FIG. 11E, which is well within the capabilities of a standard CATV television distribution system so that any distortions which might normally occur in the signal, provided to the CATV distribution system resulting from the use of such a transmission system are compensated for.

It should be noted that unless otherwise indicated in the specification, all circuitry components are preferably conventional although the overall system of the present invention as well as the utilization of such circuitry for the preferred transmission scheme is not conventional.

It is to be understood that the above described embodiments of the invention are merely illustrative of the principles thereof and that numerous modifications and embodiments of the invention may be derived within the spirit and scope thereof.

What is claimed is:

1. A real time frame grabbing system for substantially instantaneously providing a continuous video display of a selectable predetermined video frame of information on a video display means from continuously transmittable video information comprising first means for transmitting said video information as a first plurality of pseudo video scan lines, second means for transmitting said video information as a second plurality of pseudo video scan lines, each of said pseudo video scan lines from said first and second transmitting means having a television video scan line format and capable of comprising a complete self-contained packet of digital information sufficient to provide an entire displayable row of video data characters, said displayable row comprising a plurality of television video scan lines, said pseudo video scan line having an associated transmission time equivalent to said television video scan line, said packet of digital information comprising at least address information for said displayable row and data information for said displayable characters in said displayable row, said first transmitting means transmitting said first plurality of pseudo video scan lines out of phase in time in a predetermined phase relationship with the transmission of said second plurality of pseudo video scan lines by said second transmitting means with said digital information content of said first and second plurality of pseudo video scan lines being substantially identical, and means for selectively combining and interleaving corresponding identical out of phase digital information content containing pseudo video scan line portions of said first and second plurality of pseudo video scan lines to provide an in phase composite combined interleaved pseudo video scan line to said video display means, said composite combined interleaved pseudo video scan line having said television video scan line format and capable of comprising a complete self-contained composite packet of digital information equivalent in content to said content of either of said interleaved pseudo video scan lines and sufficient to provide said entire displayable row of video data characters to said video display means, said combined interleaved composite pseudo video scan line having said associated transmission time, the interleaved information containing portions of said corresponding pseudo video scan line of said first plurality of pseudo video scan lines comprising different television video scan lines of said plurality of television video scan lines which comprise said composite pseudo video scan line displayable row than the interleaved portions of said corresponding pseudo video scan line of said second plurality of pseudo video scan lines.

2. A real time frame grabbing system in accordance with claim 1 wherein said first transmitting means transmits said first plurality of pseudo video scan lines substantially 180° out of phase in time with the transmission of said second plurality of pseudo video scan lines by said second transmitting means.

3. A real time frame grabbing system in accordance with claim 2 wherein said combining and interleaving means comprises means for selecting and interleaving each of said corresponding pseudo video scan line portions every other television video scan line for said plurality of television video scan lines comprising said composite pseudo video scan line displayable row with one or the other of said pseudo video scan line portions being alternately selected for each television video scan line of said composite displayable row plurality of television video scan lines.

4. A real time frame grabbing system in accordance with claim 3 wherein said composite displayable row plurality of television video scan lines comprises alternating odd and even numbered television video scan lines with said combining and interleaving means selecting said portions of said corresponding pseudo video scan line of said first plurality for each of said odd numbered television video scan lines and selecting said portions of said corresponding pseudo video scan lines of said second plurality for each of said even numbered television video scan lines.

5. A real time frame grabbing system in accordance with claim 4 wherein said combining and interleaving means comprises means for providing a video black signal for each of said television video scan lines of said plurality comprising said composite displayable row for which a corresponding pseudo video scan line portion is not transmitted.

6. A real time frame grabbing system in accordance with claim 5 wherein said combining and interleaving means further comprises means for providing said composite combined interleaved pseudo video scan line from the corresponding pseudo video scan line portion transmitted from said first transmitting means and said video black signals in the absence of said transmission of corresponding pseudo video scan line portions from said second transmitting means.

7. A real time frame grabbing system in accordance with claim 1 wherein said combining and interleaving means comprises means for selecting and interleaving each of said corresponding pseudo video scan line portions every other television video scan line for said plurality of television video scan lines comprising said composite pseudo video scan line displayable row with one or the other of said pseudo video scan line portions being alternately selected each television video scan line of said composite displayable row plurality of television video scan lines.

8. A real time frame grabbing system in accordance with claim 7 wherein said composite displayable row plurality of television video scan lines comprises alternating odd and even numbered television video scan lines with said combining and interleaving means selecting said portions of said corresponding pseudo video scan line of said first plurality for each of said odd numbered television video scan lines and selecting said portions of said corresponding pseudo video scan line of said second plurality for each of said even numbered television video scan lines.

9. A real time frame grabbing system in accordance with claim 8 wherein said combining and interleaving means comprises means for providing a video black signal for each of said television video scan lines of said plurality comprising said composite displayable row for which a corresponding pseudo video scan line portion is not transmitted.

10. A real time frame grabbing system in accordance with claim 9 wherein said combining and interleaving means further comprises means for providing said composite combined interleaved pseudo video scan line from the corresponding pseudo video scan line portion transmitted from said first transmitting means and said video black signals in the absence of said transmission of corresponding pseudo video scan line portions from said second transmitting means.

11. A real time frame grabbing system in accordance with claim 1 wherein said combining and interleaving means comprises means for providing a video black signal for each of said television video scan lines of said plurality comprising said composite displayable row for which a corresponding pseudo video scan line portion is not transmitted.

12. A real time frame grabbing system in accordance with claim 11 wherein said combining and interleaving means further comprises means for providing said composite combined interleaved pseudo video scan line from the corresponding pseudo video scan line portions transmitted from said first transmitting means and said video black signals in the absence of said transmission of corresponding pseudo video scan line portions from said second transmitting means.

13. A real time frame grabbing system in accordance with claim 1 wherein said combining and interleaving means comprises means for providing a composite video signal as said composite combined interleaved pseudo video scan line, said composite video signal providing means providing a horizontal sync signal at the beginning of each of said composite combined interleaved pseudo video scan lines, said horizontal sync signal providing a record separator between adjacent composite combined interleaved pseudo video scan lines.

14. A real time frame grabbing system in accordance with claim 13 wherein said composite video signal providing means further provides a vertical sync signal after a predetermined plurality of composite combined interleaved pseudo video scan lines have been provided from said combining and interleaving means.

15. A real time frame grabbing system in accordance with claim 14 wherein said combining and interleaving means further comprises means for providing at least one empty line to said video display means after vertical blanking but prior to data line transmission of a plurality of composite combined interleaved pseudo video scan lines which comprise said video frame, and means for inserting a start bit pulse in said empty line for enabling phase lock by said video display means prior to the reception of data at the start of said vertical video frame.

16. A real time frame grabbing system in accordance with claim 1 wherein said combining and interleaving means further comprises means for providing at least one empty line to said video display means after vertical blanking but prior to data line transmission of a plurality of composite combined interleaved pseudo video scan lines which comprise said video frame, and means for inserting a start bit pulse in said empty line for enabling phase lock by said video display means prior to reception of data at the start of said vertical video frame.

17. A real time frame grabbing system in accordance with claim 1 wherein said system further comprises television signal distribution means for distributing said provided composite combined interleaved pseudo video scan line signals to said video display means for providing said continuous video display and receiver means operatively connected between said television signal distribution means and said video display means for processing said distributed composite combined interleaved pseudo video scan line signals and capable of providing a displayable video row signal to said video display means from each of said composite combined interleaved pseudo video scan line signals pertaining to said selected frame for providing said continuous video display, a predetermined plurality of displayable video rows comprising said displayable video frame of information.

18. A real time frame grabbing system in accordance with claim 17 wherein said receiver means comprises means for updating said continuously video displayable selectable frame on a displayable video row-by-row basis dependent on the real time data information content of said received composite combined interleaved pseudo video scan lines.

19. A real time frame grabbing system in accordance with claim 17 wherein said combining and interleaving means comprises means for selecting and interleaving each of said corresponding pseudo video scan line portions every other television video scan line for said plurality of television video scan lines comprising said composite pseudo video scan line displayable row with one or the other of said pseudo video scan line portions being alternately selected for each television video scan line of said composite displayable row plurality of television video scan lines.

20. A real time frame grabbing system in accordance with claim 19 wherein said composite displayable row plurality of television video scan lines comprises alternating odd and even numbered television video scan lines with said combining and interleaving means selecting said portions of said corresponding pseudo video scan line of said first plurality for each of said odd numbered television video scan lines and selecting said portions of said corresponding pseudo video scan line of said second plurality for each of said even numbered television video scan lines.

21. A real time frame grabbing system in accordance with claim 20 wherein said combining and interleaving means comprises means for providing a video black signal for each of said television video scan lines of said plurality comprising said composite displayable row for which a corresponding pseudo video scan line portion is not transmitted.

22. A real time frame grabbing system in accordance with claim 21 wherein said combining and interleaving means further comprises means for providing said composite combined interleaved pseudo video scan line from the corresponding pseudo video scan line portions transmitted from said first transmitting means and said video black signals in the absence of said transmission of corresponding pseudo video scan line portions from said second transmitting means.

23. A real time frame grabbing system in accordance with claim 17 wherein each of said packets of digital information comprised in said composite combined interleaved pseudo video scan lines further comprises an error check information content based on said data information content for said displayable characters of an associated composite combined interleaved pseudo video scan line, said receiver signal processing means comprising error check means for obtaining an error check indication from said distributed associated composite combined interleaved pseudo video scan line and comparing said error check indication with said error check information content of said associated composite combined interleaved pseudo video scan line in accordance with a predetermined error check condition for providing a predetermined output condition signal when said error check condition is satisfied, said receiver signal processing means further comprising condition responsive means operatively connected to said error check means to receive said predetermined output condition signal therefrom when provided, said condition responsive means inhibiting the provision of said displayable video row from said associated composite combined interleaved pseudo video scan line signal when said predetermined output condition signal is not provided thereto.

24. A real time frame grabbing system in accordance with claim 17 wherein said television signal distribution means comprises means for compensating for television transmission distortions in said provided composite combined interleaved pseudo video scan lines provided to said video display means.

25. A real time frame grabbing system in accordance with claim 24 wherein said distortion compensation means comprises means for limiting the associated energy distribution of the waveform comprising said provided composite combined pseudo video scan line signal to bring said energy distribution within restrictions associated with said television signal distribution means.

26. A real time frame grabbing system in accordance with claim 25 wherein said limiting means comprises $\sin^2$ filter means for introducing a controllable distortion in said provided composite combined interleaved pseudo video scan line signal which provides said energy distribution limiting, the distribution of said controllably distorted signal through said television signal distribution means providing said composite combined interleaved pseudo video scan line signal to said receiver means substantially free of said television transmission distortions.

27. A real time frame grabbing system in accordance with claim 26 wherein said distortion compensation means further comprises means operatively connected to said filter means for compensating for television transmission distortions introduced by envelope detection of vestigal sideband television demodulation by providing an additional controllable distortion in said controllably distorted provided signal from said filter means, the distribution of said additionally controllably distorted signal through said television signal distribution means providing said composite combined interleaved pseudo video scan line signal to said receiver means substantially free of said vestigal sideband demodulation distortions.

28. A real time frame grabbing system in accordance with claim 24 wherein said distortion compensation means comprises means for compensating for television transmission distortions introduced by envelope detection of vestigal sideband television demodulation by providing a controllagle distortion in said provided composite combined interleaved pseudo video scan line signal, the distribution of said controllably distorted signal through said television signal distribution means providing said composite combined interleaved pseudo video scan line signal to said receiver means substantially free of said vestigal sideband demodulation distortions.

* * * * *